United States Patent
Hayashi et al.

(10) Patent No.: US 10,805,009 B2
(45) Date of Patent: Oct. 13, 2020

(54) OPTICAL MODULATION APPARATUS, AND TIMING ADJUSTMENT METHOD FOR OPTICAL MODULATION APPARATUS

(71) Applicant: Mitsubishi Electric Corporation, Chiyoda-ku (JP)

(72) Inventors: Shusaku Hayashi, Tokyo (JP); Kentaro Enoki, Tokyo (JP); Koichi Akiyama, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/323,122

(22) PCT Filed: May 22, 2017

(86) PCT No.: PCT/JP2017/019021
§ 371 (c)(1),
(2) Date: Feb. 4, 2019

(87) PCT Pub. No.: WO2018/061303
PCT Pub. Date: Apr. 5, 2018

(65) Prior Publication Data
US 2019/0229810 A1 Jul. 25, 2019

(30) Foreign Application Priority Data

Sep. 30, 2016 (JP) ................................. 2016-192838

(51) Int. Cl.
*H04B 10/50* (2013.01)
*H04B 10/516* (2013.01)
(Continued)

(52) U.S. Cl.
CPC ......... *H04B 10/5161* (2013.01); *G02F 1/225* (2013.01); *H04B 10/073* (2013.01);
(Continued)

(58) Field of Classification Search
CPC .............. H04B 10/5161; H04B 10/556; H04B 10/073; H04B 10/5057; H04B 10/50577;
(Continued)

(56) References Cited

U.S. PATENT DOCUMENTS 5,774,242 A * 6/1998 O'Sullivan ............ G01M 11/33
398/147
7,962,043 B2 * 6/2011 Conroy ................... H04J 14/06
398/152
(Continued)

FOREIGN PATENT DOCUMENTS

JP 2011-44906 A 3/2011

OTHER PUBLICATIONS

Johnston et al, Optical encoders using pseudorandom binary sequence scales, Dec. 1991, SPIE, All Document. (Year: 1991).*
(Continued)

*Primary Examiner* — Dibson J Sanchez
(74) *Attorney, Agent, or Firm* — Xsensus LLP

(57) ABSTRACT

An optical modulation apparatus that can adjust modulation timing. A timing adjuster adjusts the modulation timing on the basis of an intensity detected by a light intensity detector, after a data generator respectively generates, as a first data signal and a second data signal, a first test data signal and a second test data signal each having a data string containing a test pattern in which a plurality of continuous marks and a plurality of continuous spaces are alternately repeated, and after a phase adjuster adjusts a phase difference to zero or π.

13 Claims, 11 Drawing Sheets

(51) Int. Cl.
  *H04B 10/073* (2013.01)
  *G02F 1/225* (2006.01)
  *H04B 10/556* (2013.01)
(52) U.S. Cl.
  CPC ....... *H04B 10/556* (2013.01); *G02F 2201/58* (2013.01); *H04B 10/50* (2013.01)
(58) Field of Classification Search
  CPC ..... H04B 10/5053; H04B 10/50; G02F 1/225; G02F 2201/58
  USPC .................................................. 398/182–201
  See application file for complete search history.

(56) References Cited

U.S. PATENT DOCUMENTS

| | | | | |
|---|---|---|---|---|
| 7,965,941 | B2* | 6/2011 | Conroy | H04B 10/071 398/102 |
| 9,184,834 | B1* | 11/2015 | Zhang | H04B 10/077 |
| 9,337,934 | B1* | 5/2016 | Agazzi | H04L 7/0075 |
| 9,379,878 | B1* | 6/2016 | Lugthart | H04L 47/70 |
| 9,680,598 | B2* | 6/2017 | Inada | H04J 14/02 |
| 9,705,592 | B1* | 7/2017 | Schmogrow | G02F 1/2255 |
| 9,749,057 | B2* | 8/2017 | Yue | H04B 10/532 |
| 9,853,734 | B1* | 12/2017 | Fan | H04B 10/6165 |
| 10,038,498 | B1* | 7/2018 | Fan | H04B 7/0413 |
| 10,547,408 | B2* | 1/2020 | He | H04B 10/5053 |
| 2004/0123190 | A1* | 6/2004 | Toyoda | H04L 7/04 714/700 |
| 2008/0170864 | A1* | 7/2008 | Nishihara | H04B 10/5162 398/188 |
| 2008/0297270 | A1* | 12/2008 | Takahara | H04B 10/505 332/144 |
| 2009/0041473 | A1* | 2/2009 | Nishihara | H04B 10/5561 398/188 |
| 2010/0008677 | A1* | 1/2010 | Conroy | H04B 10/0795 398/154 |
| 2010/0080570 | A1* | 4/2010 | Conroy | H04B 10/5057 398/154 |
| 2010/0129088 | A1* | 5/2010 | Akasaka | H04B 10/50577 398/188 |
| 2011/0044702 | A1 | 2/2011 | Mizuguchi et al. | |
| 2011/0229148 | A1* | 9/2011 | Nishihara | H04B 10/5053 398/183 |
| 2011/0229150 | A1* | 9/2011 | Nishihara | H04B 10/505 398/195 |
| 2011/0293276 | A1* | 12/2011 | Takahara | H04B 10/5053 398/65 |
| 2012/0250792 | A1* | 10/2012 | Khatana | H04B 10/5053 375/308 |
| 2012/0250793 | A1* | 10/2012 | Khatana | H04L 27/364 375/308 |
| 2012/0263456 | A1* | 10/2012 | Tanaka | H04B 10/5055 398/25 |
| 2014/0233084 | A1* | 8/2014 | Ono | G02F 1/01 359/279 |
| 2015/0063825 | A1* | 3/2015 | Yamase | H04B 10/5053 398/154 |
| 2016/0099776 | A1* | 4/2016 | Nakashima | H04B 10/50572 398/186 |
| 2017/0324474 | A1* | 11/2017 | Bravi | H04B 10/07955 |
| 2018/0198531 | A1* | 7/2018 | Bhandare | H04B 10/516 |
| 2018/0367220 | A1* | 12/2018 | Nomura | H04B 10/0799 |
| 2019/0165862 | A1* | 5/2019 | Hayashi | H04B 10/5161 |

OTHER PUBLICATIONS

International Search Report dated Aug. 15, 2017 in PCT/JP2017/019021 filed on May 22, 2017.

* cited by examiner

OPTICAL MODULATION APPARATUS, AND TIMING ADJUSTMENT METHOD FOR OPTICAL MODULATION APPARATUS

TECHNICAL FIELD

The present invention relates to an optical modulation apparatus that modulates light through multiplexing on the basis of a plurality of data strings, and to a timing adjustment method for the optical modulation apparatus.

BACKGROUND ART

Known is a Mach-Zehnder (MZ) optical modulation apparatus that is included in an optical modulation apparatus. Known examples of modulation in the MZ optical modulation apparatus include quadrature-phase shift keying (QPSK) and quadrature-amplitude modulation (16QAM). In these modulation schemes, light is modulated through multiplexing on the basis of a plurality of data strings. For instance, a light beam from a laser light source is divided into two light beams: Ich and Qch. Ich and Qch are modulated on the basis of two data strings. After the modulation, Ich, and Qch whose phase has been shifted by $\pi/2$ are synthesized together.

The distance from the data generator, generating the data strings, to the optical modulator or the inside of the optical modulator can vary between the data strings. This causes timing differences between the data string after modulation. These timing differences unfortunately can degrade signal properties.

Accordingly, a light intensity detector is disposed in a following stage where Ich and Qch are synthesized, the light intensity detector detecting the intensity of the synthesized light beam. Based on the intensity detected by the light intensity detector, the timing of each data string is controlled. Such a configuration is proposed in, for instance, Patent Document 1. The configuration reduces a timing difference between the data string of Ich and the data string of Qch, that is, a timing difference in data strings between I and Q.

PRIOR ART DOCUMENTS

Patent Documents

Patent Document 1: Japanese Patent Application Laid-Open No. 2011-044906

SUMMARY

Problem to be Solved by the Invention

The technique in Patent Document 1 can presumably compensate a difference equal to or less than one cycle of bit between the data strings without any problems. The technique, however, can fail to compensate the timing difference when there is a difference equal to or more than one cycle of bit between the data strings, i.e., a multi-bit difference between the data strings. This can unfortunately fail to modulate a signal at a right timing, thus degrading the signal properties.

To address this problem, it is an object of the present invention to provide a technique for appropriately adjusting modulation timing.

Means to Solve the Problem

An optical modulation apparatus according to the present invention includes the following: a laser light source that outputs a light beam; a branch dividing the light beam output from the laser light source, into a first light beam and a second light beam; a data generator generating a first data signal and a second data signal; a first optical modulator modulating the first light beam on the basis of the first data signal; a second optical modulator modulating the second light beam on the basis of the second data signal; a timing adjuster adjusting at least one of a modulation timing at which the first optical modulator modulates the first light beam, and a modulation timing at which the second optical modulator modulates the second light beam; a phase adjuster adjusting the phase difference between a first modulated light beam that is the first light beam modulated by the first optical modulator, and a second modulated light beam that is the second light modulated by the second optical modulator; a synthesizer synthesizing the first and second modulated light beams, the phase difference between which has been adjusted by the phase adjuster, to generate a synthesized light beam; and a light intensity detector detecting the intensity of the synthesized light beam. The timing adjuster adjusts the modulation timing on the basis of the intensity detected by the light intensity detector, after the data generator respectively generates, as the first data signal and the second data signal, a first test data signal and a second test data signal each having a data string containing a test pattern in which a plurality of continuous marks and a plurality of continuous spaces are alternately repeated, and after the phase adjuster adjusts the phase difference to zero or $\pi$.

Effects of the Invention

According to the present invention, the timing adjuster adjusts the modulation timing on the basis of the intensity detected by the light intensity detector, after the data generator respectively generates, as the first data signal and the second data signal, the first test data signal and the second test data signal each having the data string containing the test pattern in which the plurality of continuous marks and the plurality of continuous spaces are alternately repeated, and after the phase adjuster adjusts the phase difference to zero or $\pi$. Such a configuration appropriately adjusts the modulation timing.

These and other objects, features, aspects and advantages of the present invention will become more apparent from the following detailed description of the present invention when taken in conjunction with the accompanying drawings.

DESCRIPTION OF EMBODIMENT(S)

First Embodiment

An optical modulation apparatus according to a first embodiment of the present invention synthesizes light beams modulated by a plurality of optical modulators, to generate a synthesized light beam, and adjusts modulation timings on the basis of the intensity of the synthesized light beam detected by a light intensity detector. This prevents modulation timing differences between a plurality of data strings.

Figure 1:
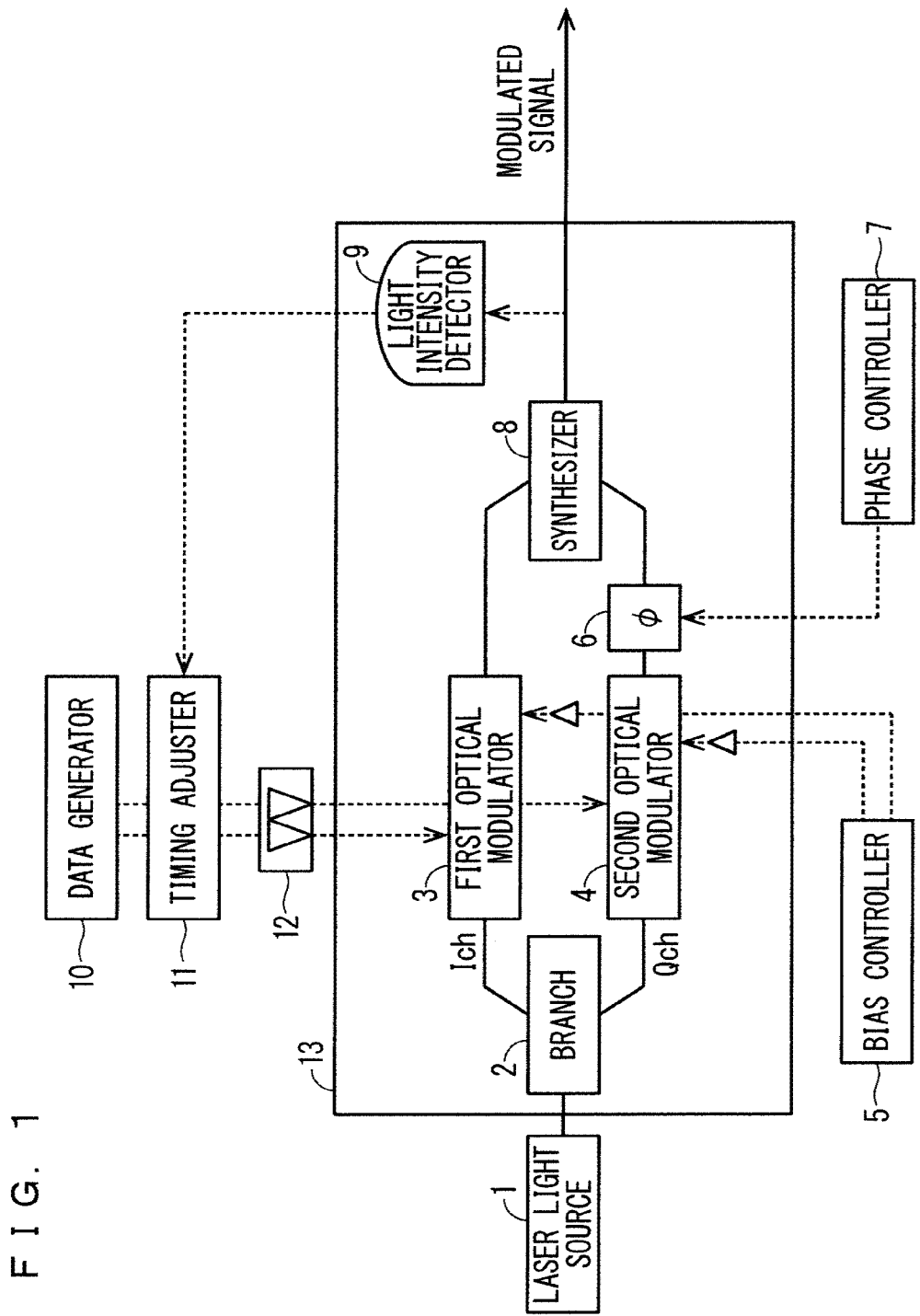
FIG. 1 is a block diagram of the configuration of an optical modulation apparatus according to a first embodiment.

FIG. 1 is a block diagram of the configuration of the optical modulation apparatus according to the first embodiment. The optical modulation apparatus in FIG. 1, which is an optical transmitter, includes a laser light source 1, a bias controller 5, a phase controller 7, a data generator 10, a timing adjuster 11, an electric-signal amplifier 12, and an optical modulation unit 13. The optical modulation unit 13 includes a branch 2, a first optical modulator 3, a second optical modulator 4, a phase adjuster 6, a synthesizer 8, and a light intensity detector 9.

Through waveguides, spaces, fibers, or other things, optical connections are established between the laser light source 1 and the branch 2, between the branch 2, and the first and second optical modulators 3 and 4, between the second optical modulator 4 and the phase adjuster, between the synthesizer 8, and the first optical modulator and the phase adjuster 6, and between the synthesizer 8 and the light intensity detector 9. Electrical connections are established between the bias controller 5, and the first and second optical modulators 3 and 4, between the phase controller 7 and the phase adjuster 6, between the light intensity detector 9 and the timing adjuster 11, between the data generator 10 and the timing adjuster 11, between the timing adjuster 11 and the electric-signal amplifier 12, and between the electric-signal amplifier 12, and the first and second optical modulators 3 and 4.

It is noted the light intensity detector 9, although disposed inside the optical modulation unit 13 in FIG. 1, may be disposed outside the optical modulation unit 13. It is also noted that the optical modulation unit 13 needs to have a plurality of modulators, and may have any configuration other than the configuration in FIG. 1. It is also noted that the data generator 10, the timing adjuster 11, and the electric-signal amplifier 12 need to input electric signals to a plurality of optical modulators, and may have any configuration other than the configuration in FIG. 1.

The following details the individual components of the optical modulation apparatus according to the first embodiment.

The laser light source 1 outputs a light beams. The branch 2, which is a signal branch, divides the light beam output from the laser light source 1, into a first light beam and a second light beam.

The data generator 10 generates a first data signal and a second data signal. For multi-level modulation, the data generator 10 generates a plurality of data signals each containing a data string.

The timing adjuster 11 adjusts the timing at which the first data signal generated in the data generator 10 is input to the first optical modulator 3 via the electric-signal data signal generated in the data generator 10 is input to the second optical modulator 4 via the electric-signal amplifier 12.

The electric-signal amplifier 12 amplifies the first data signal, which is an electric signal, and outputs the amplified first data signal to the first optical modulator 3. Likewise, the electric-signal amplifier 12 amplifies the second data signal, which is an electric signal, and outputs the amplified second data signal to the second optical modulator 4.

It is noted that at least one of the data generator 10, the timing adjuster 11, and the electric-signal amplifier 12 may be implemented by a large-scale integration (LSI) or an integrated circuit (IC).

The first optical modulator 3 modulates the first light beam on the basis of the first data signal. The second optical modulator 4 modulates the second light beam on the basis of the second data signal. Each of the first and second optical modulators 3 and 4 is a MZ optical modulator made of, for instance, indium phosphide.

The MZ optical modulator modulates light using a refractive index change, i.e., an "electro-optic effect", resulting from field application. To be specific, the MZ optical modulator includes an interferometer, i.e., "Mach-Zehnder interferometer", in which two optical waveguides having electrodes are connected in parallel between the two optical waveguides of one of Y-branch optical waveguides and the two optical waveguides of the other Y-branch optical waveguide. The MZ optical modulator changes the refractive indexes of the two optical waveguides on the basis of a modulation signal applied to a modulation electrode and of a bias voltage applied to a bias electrode. The MZ optical modulator then modulates light passing through the Mach-Zehnder interferometer by changing the light's intensity according to a phase difference between the two optical waveguides that results from changes in the refractive indexes. Such a MZ optical modulator achieves both high signal quality such as a low chirp, and rapid speed.

The timing adjuster 11 in the first embodiment adjusts the timing at which the first data signal is input to the first optical modulator 3, to adjust a modulation timing at which the first optical modulator 3 modulates the first light beam on the basis of the first data signal. Likewise, the timing adjuster 11 adjusts the timing at which the second data signal is input to the second optical modulator 4, to adjust a timing modulation at which the second optical modulator 4 modulates the second light beam on the basis of the second data signal. It is noted that the timing adjuster 11 may adjust not both of the modulation timing for the first optical modulator 3 and the modulation timing for the second optical modulator 4, but only one of both.

The first light beam that has been modulated by the first optical modulator 3 is hereinafter referred to as an In-phase-channel (Ich) optical signal or a first modulated light beam Ich. Further, the second light beam that has been modulated by the second optical modulator 4 is hereinafter referred to as a Quadrature-phase-channel (Qch) optical signal or a second modulated light beam Qch.

The phase adjuster 6 adjust a phase difference, which is the amount of phase shift between the first modulated light beam Ich and the second modulated light beam Qch. Under the control of the phase controller 7, the phase adjuster 6 adjusts the phase difference to be π/2 at normal times, and to zero when the timing adjuster 11 adjusts the modulation timings as described later. The phase adjuster 6, although disposed in a stage following the second optical modulator 4 in the example of FIG. 1, may be disposed in any stage. For instance, the phase adjuster 6 may be disposed in a stage following the first optical modulator 3, or in a stage following both of the first and second optical modulators 3 and 4.

The synthesizer 8, which is a signal synthesizer, synthesizes the first and second modulated light beams Ich and Qch, the phase difference between which has been adjusted by the phase adjuster 6, to generate a synthesized light beam.

Such an optical modulation unit 13, including the branch 2, the first and second optical modulators 3 and 4, the phase adjuster 6, and the synthesizer 8, is a dual-parallel Mach-Zehnder modulator (DP-MZM), also called an I/Q modulator, that has MZ optical modulators connected in parallel as Mz interferometers. The optical modulation unit 13 provides a carrier phase difference and synthesizes an Ich optical signal, which is a real part, and a Qch optical signal, which is an imaginary part, to generate a complex-light electric field.

The light intensity detector 9 detects the intensity of the synthesized light beam generated by the synthesizer 8, by extension, by the optical modulation unit 13. Examples of the light intensity detector 9 include a photodiode (PD) and other things. It is assumed that the light intensity detected by the light intensity detector 9 herein is the intensity of light cumulated within a predetermined time.

The bias controller 5 controls the bias voltages across the first and second optical modulators 3 and 4. The phase controller 7 controls the adjustment in the phase adjuster 6, of the phase difference between the first modulated light beam Ich and the second modulated light beam Qch.

Operation

The following outlines the operation of the optical modulation apparatus according to the first embodiment.

The light beam from the laser light source 1 is branched into the first light beam and the second light beam by the branch 2. The first and second light beams are input to the first and second optical modulators 3 and 4. The first and second light beams are modulated by the first and second optical modulators 3 and 4, when the first and second data signals, generated by the data generator 10 and then amplified by the electric-signal amplifier 12, are input to the first and second optical modulators 3 and 4, and when the bias voltages are applied across the first and second optical modulators 3 and 4 by the bias controller 5.

The second modulated light beam Qch from the second optical modulator 4 is input to the phase adjuster 6, and thus undergoes phase shift with respect to the first modulated light beam Ich, which is output from the first optical modulator 3. The amount of phase shift is determined by a value fixed by the phase controller 7. The amount of phase shift, i.e., the aforementioned phase difference, is adjusted to be π/2 at normal times. Hence, the first modulated light beam Ich from the first optical modulator 3 and the second modulated light beam from the phase adjuster 6 are synthesized in the synthesizer 8, thus generating a synthesized light beam of a QPSK modulated signal. The intensity of part of the synthesized light beam generated in the synthesizer 8 is detected by the light intensity detector 9.

In the modulation timing adjustment, the data generator 10 generates a first test data signal as the first data signal, and a second test data signal as the second data signal. The first and second test data signals each have a data string containing a test pattern in which a plurality of continuous marks and a plurality of continuous spaces are alternatively repeated. The marks correspond to "1" of one bit. The spaces correspond to "0" of one bit. Furthermore, it is assumed that the continuous marks are as many as the continuous spaces. A data string having a test pattern in which continuous N marks and continuous N spaces are alternatively repeated, is hereinafter referred to as a "an N-continuous-repetition test data string". Furthermore, N is an integer equal to or more than two in the first embodiment. A test data string having a triple-continuous repetition, for instance, is expressed as "111000111000 . . . ".

In the modulation timing adjustment, the phase adjuster 6 adjusts the phase difference between the first modulated light beam Ich and the second modulated light beam Qch to zero.

The timing adjuster 11 adjusts the modulation timings on the basis of the intensity detected by the light intensity detector 9, after the data generator 10 generates the first and second test data signals, and after the phase adjuster 6 adjusts the phase difference. The following describes an example where the test patterns of the first and second test data signals are "in phase" with each other, and where the timing adjuster 11 adjusts the modulation timings in such a manner that the intensity detected by the light intensity detector 9 is maximum.

Figure 2:
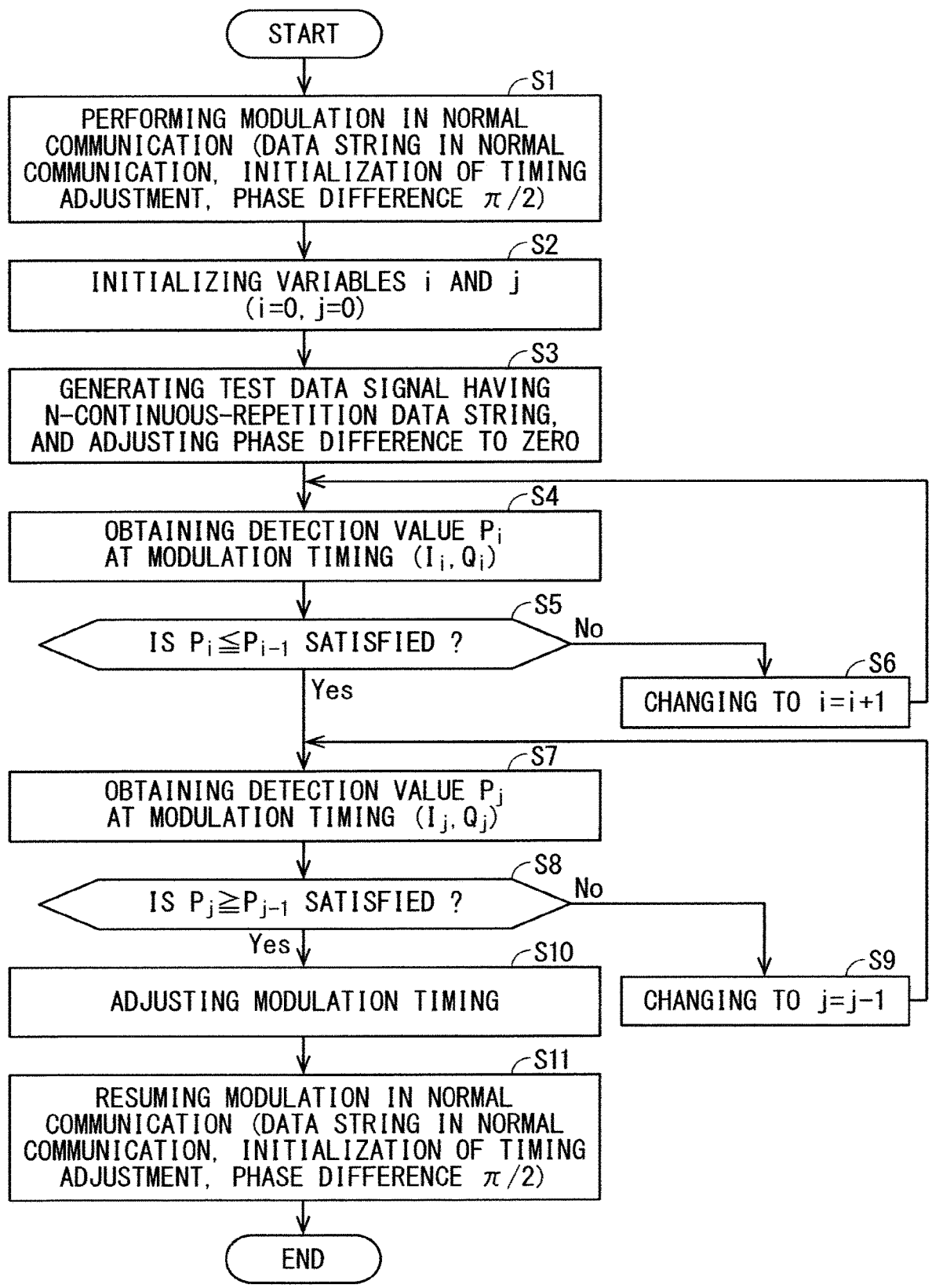
FIG. 2 is a flowchart showing the operation of the optical modulation apparatus according to the first embodiment.

FIG. 2 is a flowchart showing the operation of the optical modulation apparatus according to the first embodiment.

Firstly, step S1 is performing modulation in normal communication. The optical modulation apparatus in the first embodiment outputs a QPSK modulated signal at normal times.

To be specific, the data generator 10 generates, as the first and second data signals, signals that have data strings containing data pieces to be communicated.

The timing adjuster 11 adjusts the timings at which the first and second data signals are amplified by the electric-signal amplifier 12 and are then input to the first and second optical modulators 3 and 4, thus adjusting the modulation timings for the first and second optical modulators 3 and 4 to be a modulation timing $(I_0, Q_0)$, which is a given initial value. It is assumed that a modulation timing $(I_k, Q_k)$ in the following description means advancing the modulation timing for the first optical modulator 3 by k bits with respect to the modulation timing for the second optical modulator 4, from the initial value of modulation timing for the first and second optical modulators 3 and 4. Further, it is assumed that the modulation timing $(I_{-k}, Q_{-k})$ in the following description means delaying the modulation timing for the first optical modulator 3 by k bits with respect to the modulation timing for the second optical modulator 4, from the initial value of modulation timing for the first and second optical modulators 3 and 4.

The bias controller 5 always controls the bias voltages applied across the first and second optical modulators 3 and 4 in such a manner the optical outputs from the first and second optical modulators 3 and 4 are minimum (a null point) when no electric signal from the electric-signal amplifier 12 is input. Under the control of the phase controller 7, the phase adjuster 6 adjusts the phase difference between the first modulated light beam Ich and the second modulated light beam Qch to be $\pi/2$. Accordingly, the optical modulation apparatus outputs the QPSK modulated signal.

Step S2 through step S10 are performing the modulation timing adjustment. These process steps are performed as appropriate.

In step S2, the timing adjuster 11 initializes variables i and j as i=0, j=0.

In step S3, the data generator 10 generates, as the first data signal, the first test data signal having an N-continuous-repetition data string, and generates, as the second data signal, the second test data signal having an N-continuous-repetition data string. It is assumed that the test pattern of the first test data signal and the test pattern of the second test data signal herein are in phase. In this case, the first and second test data signals are both expressed as "111000111000" provided that N denotes three in the N-continuous-repetition data string. The first and second optical modulators 3 and 4, which modulate phases, output data pieces having a phase of zero when the data generator 10 outputs "0", and output data pieces with a phase of $\pi$ when the data generator 10 outputs "1".

In step S3, under the control of the phase controller 7, the phase adjuster 6 adjusts the phase difference between the first modulated light beam Ich and the second modulated light beam Qch to zero.

In step S4, the timing adjuster 11 obtains, as a detection value $P_i$, an intensity detected by the light intensity detector 9 at a modulation timing $(I_i, Q_i)$.

In step S5, the timing adjuster 11 determines whether $P_i$ is equal to or smaller than $P_{i-1}$. The processing proceeds to step S7 if $P_i$ is determined to be equal to or smaller than $P_{i-1}$. The processing proceeds to step S6 if $P_i$ is determined to be greater than $P_{i-1}$. For i=0, the processing proceeds to step S6.

In step S6, the timing adjuster 11 increments the variable i. Accordingly, the modulation timing is shifted by one bit in a plus direction. The processing then returns to step S4.

In step S7, the timing adjuster 11 obtains, as a detection value $P_j$, an intensity detected by the light intensity detector 9 at a modulation timing $(I_j, Q_j)$.

In step S8, the timing adjuster 11 determines whether $P_j$ is equal to or greater than $P_{j-1}$. The processing proceeds to step S10 if $P_j$ is determined to be equal to or greater than $P_{j-1}$. The processing proceeds to step S9 if $P_j$ is determined to be smaller than $P_{j-1}$. For j=0, the processing proceeds to step S9.

In step S9, the timing adjuster 11 decrements the variable j. Accordingly, the modulation timing is shifted by one bit in a minus direction. The processing then returns to step S7.

In step S10, the timing adjuster 11 adjusts the modulation timings for the first and second optical modulators 3 and 4 to a modulation timing $(I_{i-1}, Q_{i-1})$, when $P_{i-1}$ is equal to or greater than $P_j$. That is, the timing adjuster 11 advances the modulation timing for the first optical modulator 3 by (i−1) bits with respect to the modulation timing for the second optical modulator 4, from the initial value of modulation timing for the first and second optical modulators 3 and 4.

Meanwhile, the timing adjuster 11 adjusts the modulation timings for the first and second optical modulators 3 and 4 to a modulation timing $(I_j, Q_j)$, when $P_{i-1}$ is smaller than $P_j$. That is, the timing adjuster 11 delays the modulation timing for the first optical modulator 3 by bits corresponding to an absolute value of the variable j, i.e., by |j| bits with respect to the modulation timing for the second optical modulator 4, from the initial value of modulation timing for the first and second optical modulators 3 and 4.

After these process steps, step S11 is resuming the modulation in normal communication. To be specific, the data generator 10 generates, as the first and second data signals, signals that have data strings containing data pieces to be communicated. The timing adjuster 11 maintains the modulation timing adjustment in step S10. Under the control of the phase controller 7, the phase adjuster 6 adjusts the phase difference between the first modulated light beam Ich and the second modulated light beam Qch to be $\pi/2$. Accordingly, the optical modulation apparatus outputs the QPSK modulated signal in which the modulation timings have been appropriately adjusted.

Gist of First Embodiment

Figure 3:
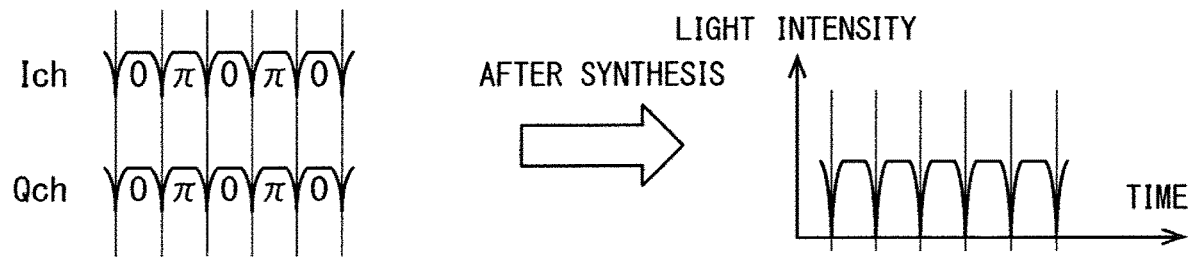
FIG. 3 is a diagram illustrating the operation of a first related optical modulation apparatus.
Figure 4:
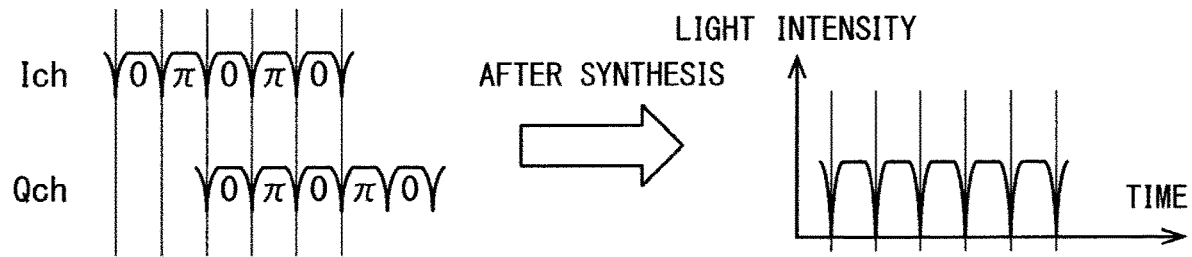
FIG. 4 is a diagram illustrating the operation of the first related optical modulation apparatus.

The following describes a first related optical modulation apparatus that does not use test data signals each having an N-continuous-repetition data string, but uses test data signals each having a data string containing a test pattern in which a single mark and a single space are alternately repeated. FIGS. 3 and 4 illustrate, as light intensity, the intensity of a synthesized light beam detected by a light intensity detector, in the first related optical modulation apparatus. FIG. 3 illustrates an ideal condition where the modulation timings for the first and second modulated light beams Ich and Qch are not different from each other. FIG. 4 illustrates that the modulation timings for the first and second modulated light beams Ich and Qch are different from each other by two bits. The intensity of the synthesized light beam in FIG. 3 is the same as the light intensity of the synthesized light beam in FIG. 4. Hence, the first related optical modulation apparatus fails to detect a modulation timing difference greater than one bit. This can fail to reduce the difference between the modulation timings.

Figure 5:
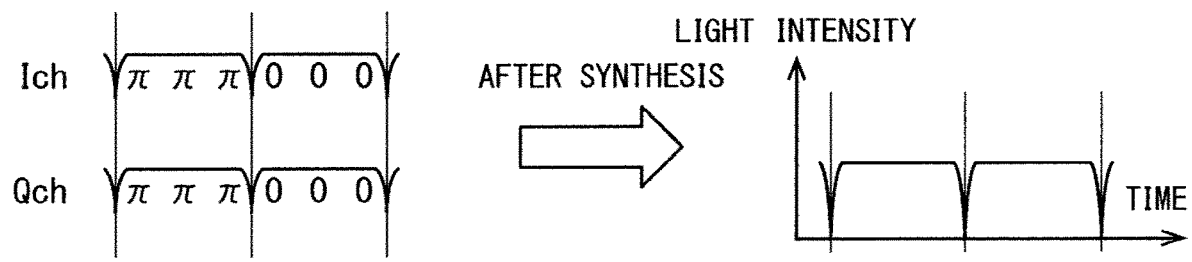
FIG. 5 is a diagram illustrating the operation of the optical modulation apparatus according to the first embodiment.
Figure 6:
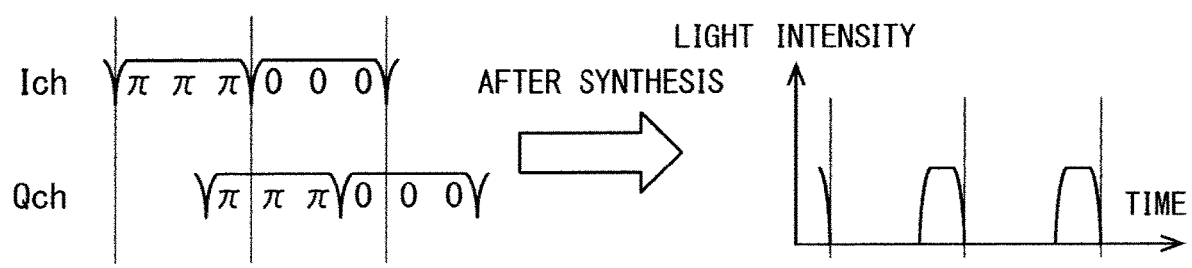
FIG. 6 is a diagram illustrating the operation of the optical modulation apparatus according to the first embodiment.

The following describes the optical modulation apparatus that uses the first test data signal and the second test data signal each having the N-continuous-repetition data string, according to the first embodiment. FIGS. 5 and 6 illustrate the intensity of the synthesized light beam detected by the light intensity detector 9, in the first embodiment. FIG. 5 illustrates an ideal condition where the modulation timings for the first and second modulated light beams Ich and Qch are not different from each other. FIG. 6 illustrates that the modulation timings for the first and second modulated light beams Ich and Qch are different from each other by two bits. The intensity of the synthesized light beam in FIG. 5 and the intensity of the synthesized light beam in FIG. 6 are different from each other. Hence, the optical modulation apparatus according to the first embodiment detects a modulation timing difference equal to or greater than one bit.

The optical modulation apparatus according to the first embodiment adjusts the modulation timings in such a manner that the intensity detected by the light intensity detector 9 is maximum, in view of the fact that the light intensity is maximum in the ideal condition illustrated in FIG. 5. Such adjustment reduces the difference between the modulation timing for the first modulated light beam Ich and the modulation timing for the second modulated light beam Qch. A test data signal having an N-continuous-repetition data string can reduce a timing difference less than N bits. The value of N is hence preferably determined in view of the number of bits corresponding to a maximum difference between the modulation timings.

Figure 7:
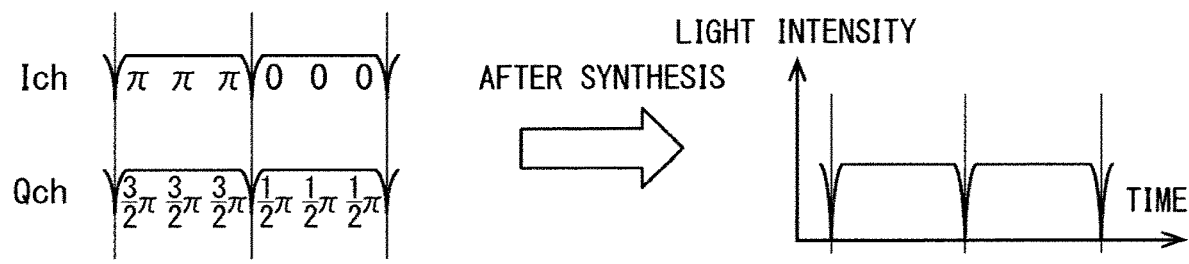
FIG. 7 is a diagram illustrating the operation of a second related optical modulation apparatus.
Figure 8:
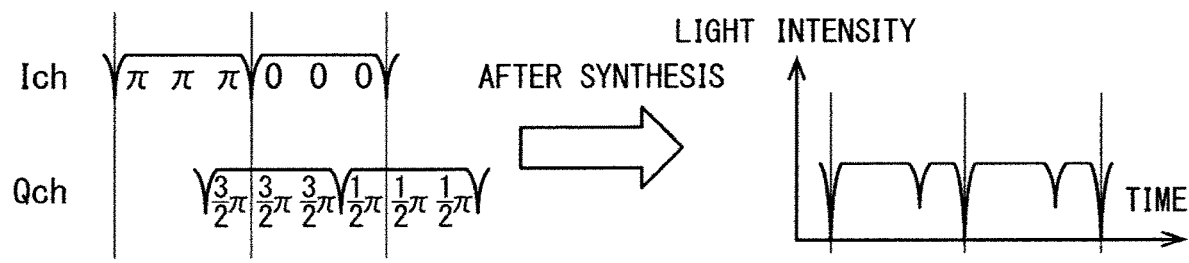
FIG. 8 is a diagram illustrating the operation of the second related optical modulation apparatus.

The following describes a second related optical modulation apparatus that uses test data signals each having an N-continuous-repetition data string, with the phase difference between the first modulated light beam Ich and the second modulated light beam Qch being kept at $\pi/2$, without the phase difference adjusted to zero. FIGS. 7 and 8 illustrate, as light intensity, the intensity of a synthesized light beam detected by a light intensity detector, in the second related optical modulation apparatus. FIG. 7 illustrates an ideal condition where the modulation timings for the first and second modulated light beams Ich and Qch are not different from each other. FIG. 8 illustrates that the modulation timings for the first and second modulated light beams Ich and Qch are different from each other by two bits. The intensity of the synthesized light beam in FIG. 7 is different from the light of the synthesized light beam in FIG. 8, but the difference is relatively small. The second related optical modulation apparatus can fail to detect a modulation timing difference equal to or greater than one bit.

By contrast, the optical modulation apparatus according to the first embodiment includes the phase adjuster 6 adjusting the aforementioned phase difference to zero, and uses the test data signals each having the data string of N-continuous repetition. Such a configuration establishes a relatively great difference between the intensity of the synthesized light beam illustrated in FIG. 5 and the intensity of the synthesized light beam illustrated in FIG. 6. This enhances the accuracy of detecting a modulation timing difference equal to or greater than one bit.

The forgoing has described that the phase adjuster 6 adjusts the aforementioned phase difference to be $\pi/2$ so that the optical modulation apparatus generates the QPSK modulated signal at normal times. The phase difference at normal times is not limited to $\pi/2$, and may change as appropriate, depending on a signal to be generated at normal times.

The foregoing has described that the final modulation timing is the closest to the initial value of modulation timing from among modulation timings at which the intensity detected by the light intensity detector 9 is local maximum. The final modulation timing is not limited to such closest timings, and may be a modulation timing at which the intensity detected by the light intensity detector 9 is maximum, from among all adjustable modulation timings.

First Modification of First Embodiment

The first embodiment has described that the test patterns of the first and second test data signals, generated by the data generator 10, are "in phase" with each other, and that the phase difference between the first and second modulated light beams Ich and Qch, adjusted by the phase adjuster 6, is "zero". In this configuration, the timing adjuster 11 adjusts the modulation timings in such a manner that the intensity detected by the light intensity detector 9 is maximum, in view of the fact that the modulation timing difference is small (FIGS. 5 and 6) when the intensity of the synthesized light beam is maximum.

Provided is a similar configuration where the test patterns of the first and second test data signals, generated by the data generator 10, are "out of phase" with each other, and where the phase difference between the first and second modulated light beams Ich and Qch, adjusted by the phase adjuster 6, is "zero". In this configuration, the modulation timing difference is small when the intensity of the synthesized light beam is minimum. In this configuration, the timing adjuster 11 may adjust the modulation timings in such a manner that the intensity detected by the light intensity detector 9 is minimum.

Second Modification of First Embodiment

Provided is a configuration where the test patterns of the first and second test data signals, generated by the data generator 10, are "in phase" with each other, and where the phase difference between the first and second modulated light beams Ich and Qch, adjusted by the phase adjuster 6, is "$\pi$". In this configuration, the timing adjuster 11, like the same in the first modification, may adjust the modulation timings in such a manner that the intensity detected by the light intensity detector 9 is minimum.

Third Modification of First Embodiment

Provided is a configuration where the test patters patterns of the first and second test data signals, generated by the data generator 10, are "out of phase" with each other, and where the phase difference between the first and second modulated light beams Ich and Qch, adjusted by the phase adjuster 6, is "it". In this configuration, the timing adjuster 11, like the same in the first and second modifications, may adjust the modulation timings in such a manner that the intensity detected by the light intensity detector 9 is maximum. It is noted that the foregoing modifications are applicable to the following second embodiment and subsequent embodiments.

SECOND EMBODIMENT

The block diagram illustrating the configuration of an optical modulation apparatus according to a second embodiment of the present invention is the same as the block diagram (FIG. 1) in the first embodiment. Identical or similar components between the first and second embodiments are denoted by the same reference numerals. Different components between these embodiments will be mainly described.

The optical modulation apparatus according to the second embodiment, like the corresponding one in the first embodiment, synthesizes light beams modulated by a plurality of optical modulators, to generate a synthesized light beam, and adjusts modulation timings on the basis of the intensity of the synthesized light beam detected by a light intensity detector. This prevents modulation timing differences between a plurality of data strings.

The second embodiment performs different adjustment in addition to the adjustment described in the first embodiment, thus enabling highly accurate adjustment of the modulation timings. The adjustment in the first embodiment is hereinafter referred to as "first adjustment"; and the different adjustment in the second embodiment, as "second adjustment". The second adjustment, although incorporated in the first adjustment in the following description, may be separated; for instance, the second adjustment may be performed after the first adjustment.

The data generator 10 in the second adjustment generates, as the first data signal, a third test data signal having a data string containing a test pattern in which a single mark and a single space are alternately repeated. The data generator 10 in the second adjustment also generates, as the second data signal, a fourth test data signal having a data string containing a test pattern in which a single mark and a single space are alternately repeated. The data string having the test pattern in which a single mark and a single space are alternately repeated, is hereinafter referred to as a "single-repetition test data string". The single-repetition test data string is the same as the N-continuous-repetition test data string, where N denotes one.

The phase adjuster 6 in the second adjustment, like the same in the first embodiment and the first to third modifications, adjusts the phase difference between the first modulated light beam Ich and the second modulated light beam Qch to zero or π. The following describes an example where the phase adjuster 6 adjusts the phase difference between the first modulated light beam Ich and the second modulated light beam Qch to zero.

The timing adjuster 11 adjusts the modulation timings on the basis of the intensity detected by the light intensity detector 9, after the data generator 10 generates the first and second test data signals, and after the phase adjuster 6 adjusts the phase difference. The following describes an example where the test patterns of the first and second test data signals are "in phase" with each other, and where the timing adjuster 11 adjusts the modulation timings in such a manner that the intensity detected by the light intensity detector 9 is maximum.

Figure 9:
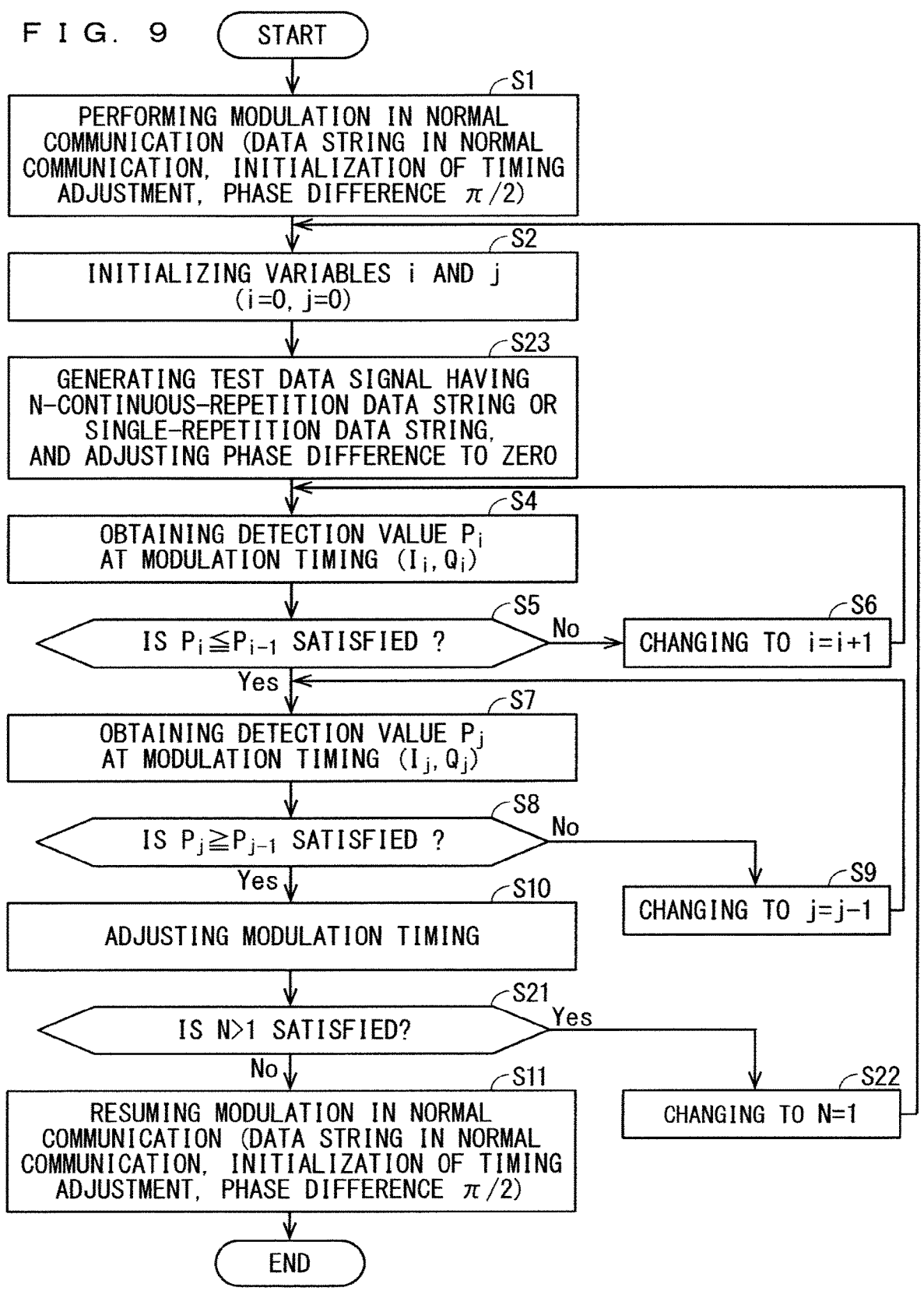
FIG. 9 is a flowchart showing the operation of an optical modulation apparatus according to a second embodiment.

FIG. 9 is a flowchart showing the operation of the optical modulation apparatus according to the second embodiment. As shown in FIG. 9, the operation of the optical modulation apparatus according to the second embodiment is similar to the operation (FIG. 2) of the optical modulation apparatus according to the first embodiment with the exception of additional steps S21 and S22 and the replacement of step S3 with step S23. The following mainly describes steps S21, S22, and S23.

Step S1 and step S2 are sequentially performed, followed by step S23. Step S23, when performed at first, uses an N-continuous-repetition test data string, where N denotes an integer equal to or greater than two, like the corresponding one in the first embodiment. As such, a series of steps S4 to S10 after step S23, like the same in the first embodiment, adjusts a modulation timing difference equal to or greater than one bit.

Then, in step S21, the timing adjuster 11 determines whether N>1 is satisfied with regard to the N-continuous-repetition test data string. The processing proceeds to step S22 if N>1 is determined to be satisfied. The processing proceeds to step S11 if N>1 is determined not to be satisfied.

In step S22, the timing adjuster 11 requests the data generator 10 to satisfy N=1 with regard to the N-continuous-repetition test data string. The processing then returns to step S2, and proceeds to step S23. In step S23, by request from the timing adjuster 11 in step S22, the data generator 10 generates the third test data signal having a single-repetition test data string, as the first data signal, and generates the fourth test data signal having a single-repetition test data string, as the second data signal.

Accordingly, the third and fourth test data signals instead of the first and second test data signals are used in steps S4 to S10, thus finely adjusting a modulation timing difference equal to or smaller than one bit. The processing then proceeds to step S21, followed by step S11.

The optical modulation apparatus according to the second embodiment performs the second adjustment, in which a modulation timing difference equal to or smaller than one bit is finely adjusted, in addition to the first adjustment, in which a modulation timing difference equal to or greater than one bit is adjusted. This enhances the accuracy of modulation timing adjustment.

Third Embodiment

The optical modulation apparatus according to the first embodiment performs QPSK modulation. An optical modulation apparatus according to a third embodiment of the present invention performs DP-QPSK modulation, which is polarization multiplexing. The optical modulation apparatus according to the third embodiment adjusts, by using a single light intensity detector 9, the modulation timing difference between the first modulated light beam Ich and the second modulated light beam Qch, in each of an X-polarized wave and a Y-polarized wave.

Figure 10:
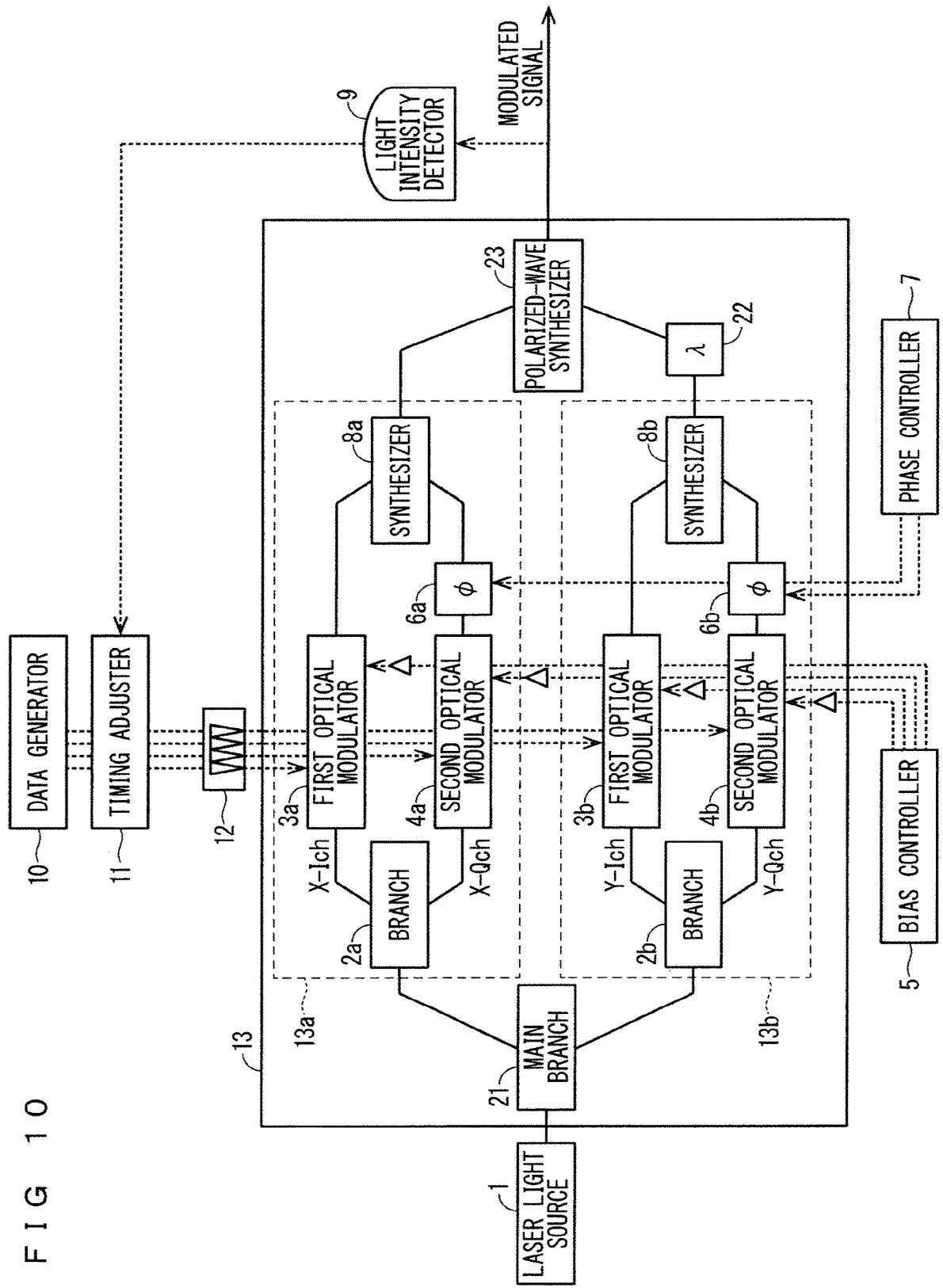
FIG. 10 is a block diagram of the configuration of an optical modulation apparatus according to a third embodiment.

FIG. 10 is a block diagram of the configuration of the optical modulation apparatus according to the third embodiment of the present invention. Identical or similar components between the first and third embodiments are denoted by the same reference numerals. Different components between these embodiments will be mainly described.

The optical modulation unit 13 in FIG. 10 includes a first optical modulation unit 13a and a second optical modulation unit 13b. The first optical modulation unit 13a includes the components of the optical modulation unit 13 in FIG. 1, described in the first embodiment, except the light intensity detector 9. That is, the first optical modulation unit 13a in FIG. 10 includes a branch 2a, first and second optical modulators 3a and 4a, a phase adjuster 6a, and a synthesizer 8a, which are respectively identical to the branch 2, the first and second optical modulators 3 and 4, the phase adjuster 6, and the synthesizer 8 in FIG. 1.

The optical modulation unit 13b in FIG. 10 includes components identical to the components of the first optical modulation unit 13a. That is, the first optical modulation unit 13b includes a branch 2b, first and second optical modulators 3b and 4b, a phase adjuster 6b, and a synthesizer 8b, which are respectively identical to the branch 2a, the first and second optical modulators 3a and 4a, the phase adjuster 6a, and the synthesizer 8a.

The optical modulation unit 13 in FIG. 10 includes a main branch 21, a polarized-wave rotator 22, and a polarized-wave synthesizer 23, in addition to the first and second optical modulation units 13a and 13b.

Through waveguides, spaces, fibers, or other things, optical connections are established between the main branch 21, and the branches 2a and 2b, between the synthesizer 8b and the polarized-wave rotator 22, between the polarized-wave synthesizer 23, and the synthesizer 8a and the polarized-wave rotator 22, and between the polarized-wave synthesizer 23 and the light intensity detector 9.

The following mainly describes the components of the optical modulation apparatus according to the third embodiment that are different from those in the first embodiment.

The main branch 21 divides a light beam output from the laser light source 1, and then outputs the divided light beams to the branch 2a of the first optical modulation unit 13a and the branch 2b of the second optical modulation unit 13b.

The data generator 10 generates a first data signal and a second data signal for each of the first optical modulation unit 13a and the second optical modulation unit 13b. That is, the data generator 10 generates the first and second data signals that are respectively input to the first and second optical modulators 3a and 4a of the first optical modulation unit 13a. In addition, the data generator 10 generates the first and second data signals that are respectively input to the first and second optical modulators 3b and 4b of the second optical modulation unit 13b.

The timing adjuster 11 adjusts modulation timings for each of the first optical modulation unit 13a and the second optical modulation unit 13b. That is, the timing adjuster 11 adjusts the modulation timings for the first and second optical modulators 3a and 4a of the first optical modulation unit 13a. In addition, the timing adjuster 11 adjusts the modulation timings for the first and second optical modulators 3b and 4b of the second optical modulation unit 13b.

The electric-signal amplifier 12 amplifies the first and second data signals for each of the first optical modulation unit 13a and the second optical modulation unit 13b. That is, the electric-signal amplifier 12 amplifies the first and second data signals that are input to the first and second optical modulators 3a and 4a of the first optical modulation unit 13a. In addition, the electric-signal amplifier 12 amplifies the first and second data signals that are input to the first and second optical modulators 3b and 4b of the second optical modulation unit 13b.

The first optical modulation unit 13a, like the optical modulation unit 13 in the first embodiment, synthesizes a first modulated light beam X-Ich, which is the first modulated light beam Ich from the first optical modulator 3a, and a second modulated light beam X-Qch, which is the second modulated light beam Qch from the second optical modulator 4a.

The second optical modulation unit 13b, like the optical modulation unit 13 in the first embodiment, synthesizes a first modulated light beam Y-Ich, which is the first modulated light beam Ich from the first optical modulator 3b, and a second modulated light beam Y-Qch, which is the second modulated light beam Qch from the second optical modulator 4b.

The polarized-wave rotator 22 rotates, by 90 degrees, the polarized wave of a synthesized light beam generated by the synthesizer 8b of the second optical modulation unit 13b. The polarized-wave synthesizer 23 synthesizes a synthesized light beam having an X-polarized wave and generated in the first optical modulation unit 13a, and the synthesized light beam having a Y-polarized wave that has been rotated in the polarized-wave rotator 22. Through this synthesis, the polarized-wave synthesizer 23 generates a polarization-multiplexed light beam. The light intensity detector 9 detects the intensity of the polarization-multiplexed light beam.

The bias controller 5 controls bias voltages across the first and second optical modulators 3a and 4a of the first optical modulation unit 13a, and controls bias voltages across the first and second optical modulators 3b and 4b of the second optical modulation unit 13b. The phase controller 7 controls the adjustment of the phase difference between the first modulated light beam X-Ich and the second modulated light beam X-Qch, and controls the adjustment of the phase difference between the first modulated light beam Y-Ich and the second modulated light beam Y-Qch.

Operation

The following outlines the operation of the optical modulation apparatus according to the third embodiment.

The light beam from the laser light source 1 is branched into two light beams by the main branch 21. One of the two light beams that is output from the main branch 21 to the first optical modulation unit 13a, is branched into a first light beam and a second light beam by the branch 2a of the first optical modulation unit 13a. The branched first and second light beams are input to the first and second optical modulators 3a and 4a. The first and second light beams are modulated by the first and second optical modulator 3a and 4a, when the first and second data signals, generated by the data generator 10 and then amplified by the electric-signal amplifier 12, are input to the first and second optical modulators 3a and 4a, and when the bias voltages are applied across the first and second optical modulators 3a and 4a by the bias controller 5. Likewise, the other light beam that is output from the main branch 21 to the second optical modulation unit 13b, is branched into a first light beam and a second light beam by the branch 2b of the second optical modulation unit 13b. The branched first and second light beams are modulated by the first and second optical modulators 3b and 4b.

The second modulated light beam X-Qch, which is output from the second optical modulator 4a, is input to the phase adjuster 6a and thus undergoes phase shift with respect to the first modulated light beam X-Ich, which is output from the first optical modulator 3a. Likewise, the second modulated light beam Y-Qch from the second optical modulator 4b is input to the phase adjuster 6b, and thus undergoes phase shift with respect to the first modulated light beam Y-Ich, which is output from the first optical modulator 3b. The amount of phase shift is determined by a value fixed by the phase controller 7.

The first modulated light beam X-Ich from the first optical modulator 3a and the second modulated light beam X-Qch from the phase adjuster 6a are synthesized by the synthesizer 8a. The first modulated light beam Y-Ich from the first optical modulator 3b and the second modulated light beam Y-Qch from the phase adjuster 6b are synthesized by the synthesizer 8b. The synthesized light beam generated in the synthesizer 8b undergoes polarized-wave rotation by 90 degrees in the polarized-wave rotator 22. The synthesized light beam from the synthesizer 8a and the synthesized light beam from the synthesizer 8b that has undergone polarized-wave rotation in the polarized-wave rotator 22, undergo polarized-wave synthesis in the polarized-wave synthesizer 23, thus generating a polarization-multiplexed light beam, which is the DP-QPSK modulated signal. The intensity of part of the polarization-multiplexed light beam, generated by the polarized-wave synthesize 23, is detected by the light intensity detector 9.

The modulation timing adjustment for the first optical modulation unit 13a and the modulation timing adjustment for the second optical modulation unit 13b are performed independently of each other in the third embodiment.

Reference is made to the modulation timing adjustment for the first optical modulation unit 13a. The data generator 10 generates the first test data signal having an N-continuous-repetition data string, as the first data signal of the first optical modulation unit 13a. The data generator 10 also generates the second test data signal having an N-continuous-repetition data string, as the second data signal of the first optical modulation unit 13a.

The phase adjuster 6a of the first optical modulation unit 13a, like the corresponding one in the first embodiment and the first to third modifications, adjusts the phase difference between the first modulated light beam X-Ich and the second modulated light beam X-Qch to zero or π. The following describes an example where the phase adjuster 6a adjusts the phase difference between the first modulated light beam X-Ich and the second modulated light beam X-Qch to zero.

The phase adjuster 6b of the second optical modulation unit 13b adjusts the phase difference between the first modulated light beam Y-Ich and the second modulated light beam Y-Qch to render the intensity of the synthesized light beam in the second optical modulation unit 13b minimum, i.e., close to non-output. To be specific, the phase adjuster 6b adjusts the phase difference between the first modulated light beam Y-Ich and the second modulated light beam Y-Qch to π, when the test patterns of the first and second test data signals are in phase. The phase adjuster 6b adjusts the phase difference between the first modulated light beam Y-Ich and the second modulated light beam Y-Qch to zero when the test patterns of the first and second test data signals are out of phase.

The timing adjuster 11, like the same in the first embodiment and the first to third modifications, adjusts the modulation timings for the first optical modulation unit 13a on the basis of the intensity detected by the light intensity detector 9, after the data generator 10 generates the first and second test data signals, and after the phase adjusters 6a and 6b adjust the phase differences. The following describes an example where the test patterns of the first and second test data signals are "in phase" with each other, and where the timing adjuster 11 adjusts the modulation timings for the first optical modulation unit 13a in such a manner that the intensity detected by the light intensity detector 9 is maximum. The synthesized light beam generated in the second optical modulation unit 13b has a minimum intensity. Accordingly, the intensity detected by the light intensity detector 9 in the modulation timing adjustment for the first optical modulation unit 13a is substantially the same as the intensity of the synthesized light beam generated in the first optical modulation unit 13a.

The foregoing has described the modulation timing adjustment for the first optical modulation unit 13a. The modulation timing adjustment for the second optical modulation unit 13b is similar to the aforementioned adjustment with the exception that the operation of the first optical modulation unit 13a is replaced with the operation of the second optical modulation unit 13b.

That is, in the modulation timing adjustment for the second optical modulation unit 13b, the data generator 10 generates the first test data signal having an N-continuous-repetition data string, as the first data signal of the second optical modulation unit 13b. In addition, the data generator 10 generates the second test data signal having an N-continuous-repetition data string, as the second data signal of the second optical modulation unit 13b.

The phase adjuster 6b of the second optical modulation unit 13b, like the corresponding one in the first embodiment and the first to third modifications, adjusts the phase difference between the first modulated light beam Y-Ich and the second modulated light beam Y-Qch to zero or $\pi$. The following describes an example where the phase adjuster 6b adjusts the phase difference between the first modulated light beam Y-Ich and the second modulated light beam Y-Qch to zero.

The phase adjuster 6a of the first optical modulation unit 13a adjusts the phase difference between the first modulated light beam X-Ich and the second modulated light beam X-Qch to render the intensity of the synthesized light beam in the first optical modulation unit 13a minimum, i.e., close to non-output. To be specific, the phase adjuster 6a adjusts the phase difference between the first modulated light beam X-Ich and the second modulated light beam X-Qch to $\pi$, when the test patterns of the first and second test data signals are in phase. The phase adjuster 6a adjusts the phase difference between the first modulated light beam X-Ich and the second modulated light beam X-Qch to zero, when the test patterns of the first and second test data signals are out of phase.

The timing adjuster 11, like the same in the first embodiment and the first to third modifications, adjusts the modulation timings for the second optical modulation unit 13b on the basis of the intensity detected by the light intensity detector 9, after the data generator 10 generates the first and second test data signals, and after the phase adjusters 6a and 6b adjust the phase differences. The following describes an example where the test patterns of the first and second test data signals are "in phase" with each other, and where the timing adjuster 11 adjusts the modulation timings for the second optical modulation unit 13b in such a manner that the intensity detected by the light intensity detector 9 is maximum. The synthesized light beam generated in the first optical modulation unit 13a has a minimum intensity. Accordingly, the intensity detected by the light intensity detector 9 in the modulation timing adjustment for the second optical modulation unit 13b is substantially the same as the intensity of the synthesized light beam generated in the second optical modulation unit 13b.

Figure 11:
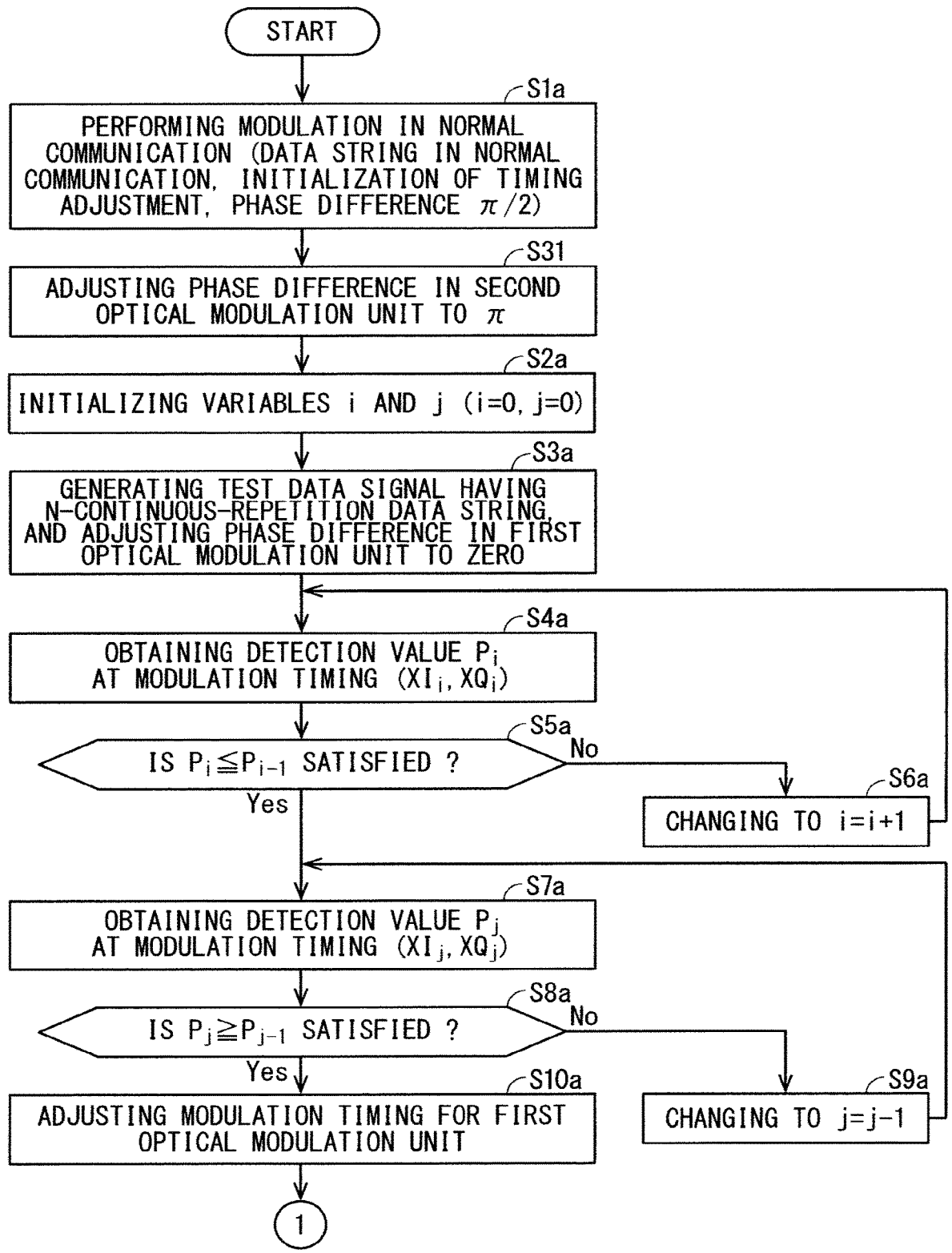
FIG. 11 is a flowchart showing the operation of the optical modulation apparatus according to the third embodiment.
Figure 12:
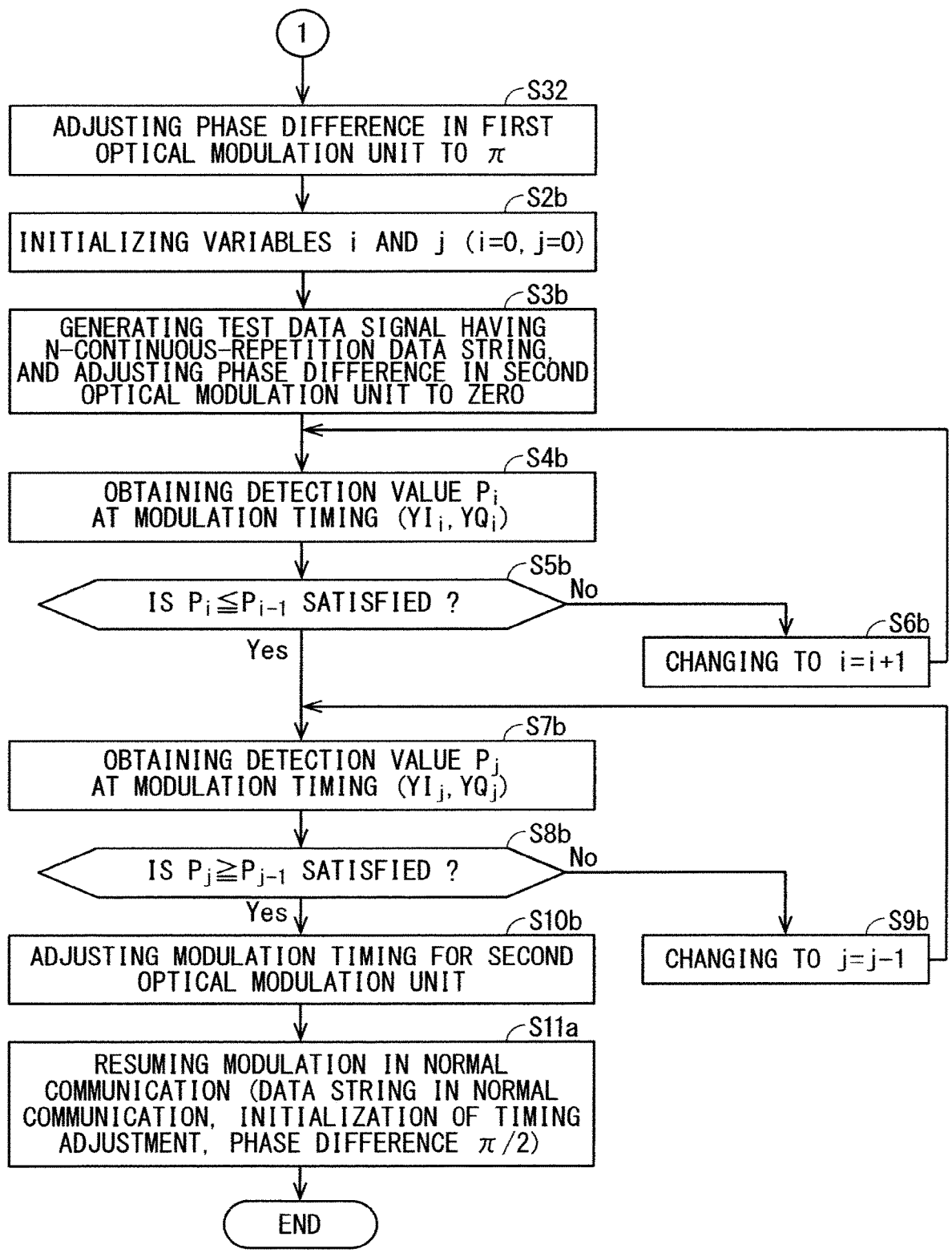
FIG. 12 is a flowchart showing the operation of the optical modulation apparatus according to the third embodiment.

FIGS. 11 and 12 are flowcharts showing the operation of the optical modulation apparatus according to the third embodiment. The process steps of the flowcharts in FIGS. 11 and 12, corresponding to the process steps of the flowchart in FIG. 2 are denoted by reference numerals corresponding to those given to the process steps in FIG. 2.

Firstly, step S1a in FIG. 11 is performing modulation in normal communication.

To be specific, the data generator 10 generates signals that have data strings containing data pieces to be communicated, as the first and second data signals of the first and second optical modulation units 13a and 13b.

The timing adjuster 11 adjusts the modulation timings for the first and second optical modulators 3a and 4a of the first optical modulation unit 13a to a modulation timing ($XI_0$, $XQ_0$), which is a given initial value. The timing adjuster 11 also adjusts the modulation timings for the first and second optical modulators 3b and 4b of the second optical modulation unit 13b to a modulation timing ($YI_0$, $YQ_0$), which is a given initial value.

The bias controller 5 always controls the bias voltages applied across these optical modulators in such a manner that the optical outputs from the first and second optical modulators 3a and 4a of the first optical modulation unit 13a, and the optical outputs from the first and second optical modulators 3b and 4b of the second optical modulation unit 13b are minimum (null points) when no electric signal is input from the electric-signal amplifier 12. The phase adjuster 6a adjusts the phase difference between the first modulated light beam X-Ich and the second modulated light beam X-Qch to $\pi/2$. The phase adjuster 6b adjusts the phase difference between the first modulated light beam Y-Ich and the second modulated light beam Y-Qch to $\pi/2$. Accordingly, the optical modulation apparatus outputs the DP-QPSK modulated signal.

Subsequently, step S31 and steps S2a to S10a are performing the modulation timing adjustment for the first optical modulation unit 13a. In addition, step S32 and steps S2b to S10b are performing the modulation timing adjustment for the second optical modulation unit 13b. These process steps are performed as appropriate.

In step S31, under the control of the phase controller 7, the phase adjuster 6b adjusts the phase difference between the first modulated light beam Y-Ich and the second modulated light beam Y-Qch to $\pi$. This adjustment minimizes the synthesized light beam generated in the second optical modulation unit 13b.

Steps S2a to S10a is performing an operation similar to that in steps S2 to S10, described in the first embodiment, on the first optical modulation unit 13a. Through these process steps, the modulation timings are adjusted with regard to the first modulated light beam X-Ich and the second modulated light beam X-Qch in the first optical modulation unit 13a.

In step S32 in FIG. 12, under the control of the phase controller 7, the phase adjuster 6a subsequently adjusts the phase difference between the first modulated light beam X-Ich and the second modulated light beam X-Qch to $\pi$.

This adjustment minimizes the synthesized light beam generated in the first optical modulation unit 13a.

Steps S2b to S10b are performing an operation similar to that in step S2 to S10, described in the first embodiment, on the second optical modulation unit 13b. Through these process steps, the modulation timings are adjusted with regard to the first modulated light beam Y-Ich and the second modulated light beam Y-Qch in the second optical modulation unit 13b.

After these process steps, step S11a is resuming the modulation in normal communication. To be specific, the data generator 10 generates signals that have data strings containing data pieces to be communicated, as the first and second data signals of the first and second optical modulation units 13a and 13b. The timing adjuster 11 maintains the modulation timing adjustment in steps S10a and S10b. The phase adjuster 6a adjusts the phase difference between the first modulated light beam X-Ich and the second modulated light beam X-Qch to π/2. The phase adjuster 6b adjusts the phase difference between the first modulated light beam Y-Ich and the second modulated light beam Y-Qch to π/2. Accordingly, the optical modulation apparatus outputs the DP-QPSK modulated signal in which the modulation timings have been appropriately adjusted.

Gist of Third Embodiment

The optical modulation apparatus according to the third embodiment, when adjusting the modulation timings for the first optical modulation unit 13a, minimizes the intensity of the synthesized light beam generated in the second optical modulation unit 13b. In addition, the optical modulation apparatus, when adjusting the modulation timings for the second optical modulation unit 13b, minimizes the intensity of the synthesized light beam generated in the first optical modulation unit 13a. This achieves an effect similar to that in the first embodiment with regard to polarization multiplexing, such as DP-QPSK modulation.

Modification of Third Embodiment

The second adjustment, described in the second embodiment, may be performed in each of the first and second optical modulation units 13a and 13b in the third embodiment.

That is, in the modulation timing adjustment for the first optical modulation unit 13a, the data generator 10 generates a third test data signal having a single-repetition test data string, as the first data signal of the first optical modulation unit 13a. In addition, the data generator 10 generates a fourth test data signal having a single-repetition test data string, as the second data signal of the first optical modulation unit 13a. The phase adjuster 6a of the first optical modulation unit 13a adjusts the phase difference in the first optical modulation unit 13a to π. Meanwhile, the phase adjuster 6b of the second optical modulation unit 13b adjusts the phase difference in the second optical modulation unit 13b so as to minimize the intensity of the synthesized light beam generated in the second optical modulation unit 13b.

The timing adjuster 11, like the same in the second embodiment, adjusts the modulation timings for the first optical modulation unit 13a on the basis of the intensity detected by the light intensity detector 9, after the data generator 10 generates the third and fourth test data signals, and after the phase adjuster 6a and 6b adjust the phase differences.

In the modulation timing adjustment for the second optical modulation unit 13b, the data generator 10 generates a third test data signal having a single-repetition test data string, as the first data signal of the second optical modulation unit 13b, and generates a fourth test data signal having a single-repetition test data string, as the second data signal of the second optical modulation unit 13b. The phase adjuster 6b of the second optical modulation unit 13b adjusts the phase difference in the second optical modulation unit 13b to zero or π. Meanwhile, the phase adjuster 6a of the first optical modulation unit 13a adjusts the phase difference in the first optical modulation unit 13a so as to minimize the intensity of the synthesized light beam generated in the first optical modulation unit 13a.

The timing adjuster 11, like the same in the second embodiment, adjusts the modulation timings for the second optical modulation unit 13b on the basis of the intensity detected by the light intensity detector 9, after the data generator 10 generates the third and fourth test data signals, and after the phase adjusters 6a and 6b adjust the phase differences.

Such a configuration achieves the effect of the second embodiment and the effect of the third embodiment.

FOURTH EMBODIMENT

The block diagram illustrating the configuration of an optical modulation apparatus according to a fourth embodiment of the present invention is the same as the block diagram (FIG. 1) in the first embodiment. Identical or similar components between the first and fourth embodiments are denoted by the same reference numerals. Different components between these embodiments will be mainly described.

The optical modulation apparatus according to the fourth embodiment, like the same in the first embodiment, synthesizes light beams modulated by a plurality of optical modulators, to generate a synthesized light beam, and adjusts modulation timings on the basis of the intensity of the synthesized light beam detected by a light intensity detector. This prevents modulation timing differences between a plurality of data strings.

The fourth embodiment performs different adjustment in addition to the adjustment described in the first embodiment, thus enabling further highly accurate adjustment of the modulation timings. The adjustment in the first embodiment is hereinafter referred to as "first adjustment"; and the different adjustment in the fourth embodiment, as "second adjustment".

The phase adjuster 6 in the second adjustment, like the same in the first embodiment and the first to third modifications, adjusts the phase difference between the first modulated light beam Ich and the second modulated light beam Qch to zero or π. The following describes an example where the phase adjuster 6 adjusts the phase difference between the first modulated light beam Ich and the second modulated light beam Qch to zero.

The timing adjuster 11, like the same in the first embodiment and the first to third modifications, adjusts the modulation timings on the basis of the intensity detected by the light intensity detector 9, after the data generator 10 generates first and second test data signals, and after the phase adjuster 6 adjusts a phase difference. The following describes an example where the test patterns of the first and second test data signals are "in phase" with each other, and where the timing adjuster 11 adjusts the modulation timings in such a manner that the intensity detected by the light intensity detector 9 is maximum.

The timing adjuster 11 according to the fourth embodiment determines two sets of a modulation timing for the first optical modulator 3 and a modulation timing for the second optical modulator 4 at the time when the intensity detected by the light intensity detector 9 is half an intensity that is predetermined from among intensities detected by the light intensity detector 9. Hereinafter, it is assumed that the predetermined intensity is expressed as $P_{max}$, which is the maximum detection value detected by the light intensity detector 9. It is noted that the predetermined intensity may be the minimum detection value detected in the light intensity detector 9, depending on the phase difference between the first modulated light beam Ich and the second modulated light beam Qch, and on the phase difference between the test patterns of the first and second test data signals. Furthermore, the fact that the intensity detected by the light intensity detector 9 is half the maximum detection value $P_{max}$ includes the fact that the difference between the intensity detected by the light intensity detector 9 and half the maximum detection value $P_{max}$ is equal to or smaller than a predetermined value.

The timing adjuster 11 according to the fourth embodiment adjusts the modulation timing for the first optical modulator 3 and the modulation timing for the second optical modulator 4, to a middle value between one of the two sets of the modulation timing for the first optical modulator 3 and the modulation timing for the second optical modulator 4, and the other set of the modulation timing for the first optical modulator 3 and the modulation timing for the second optical modulator 4.

Figure 13:
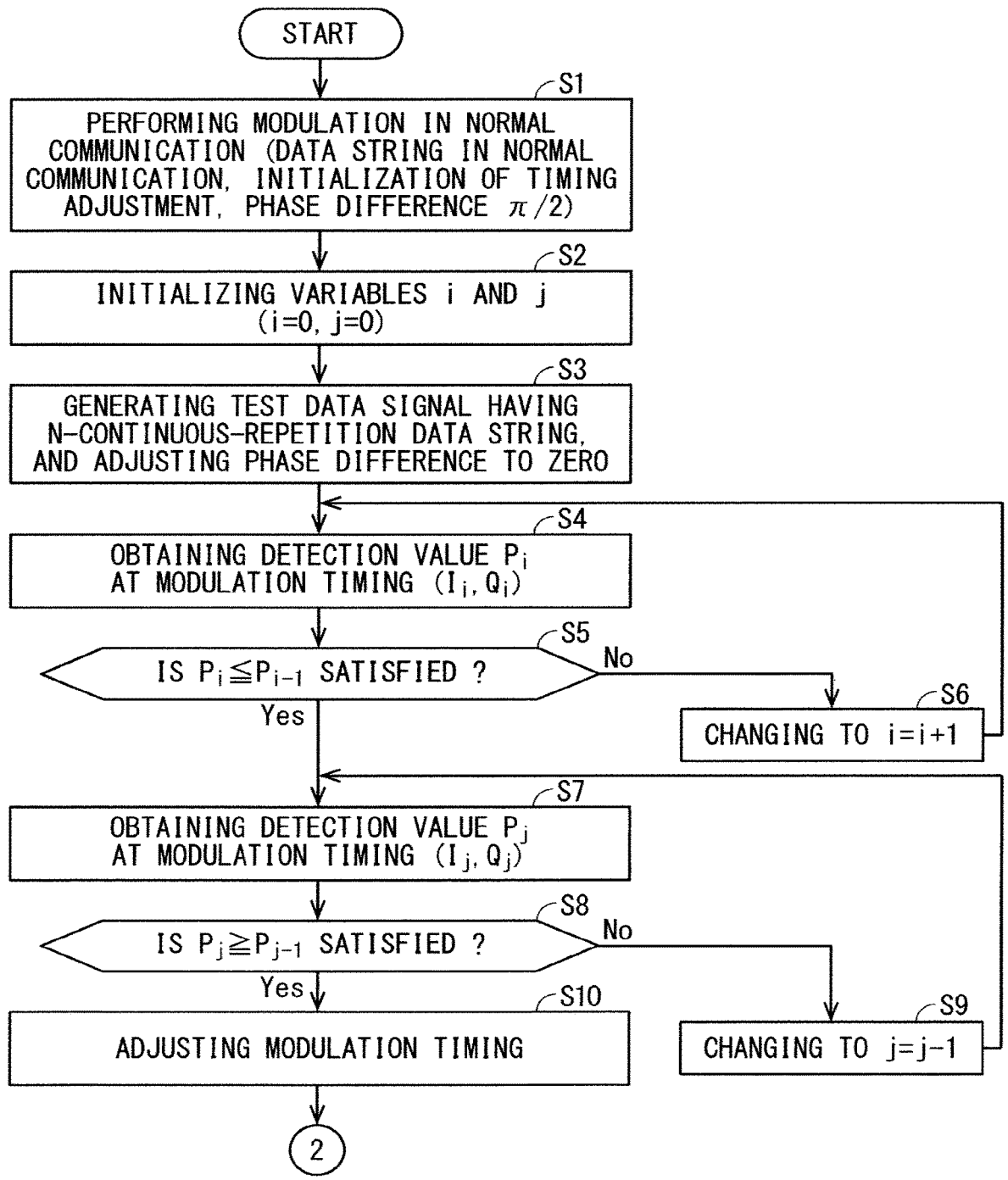
FIG. 13 is a flowchart showing the operation of an optical modulation apparatus according to a fourth embodiment.
Figure 14:
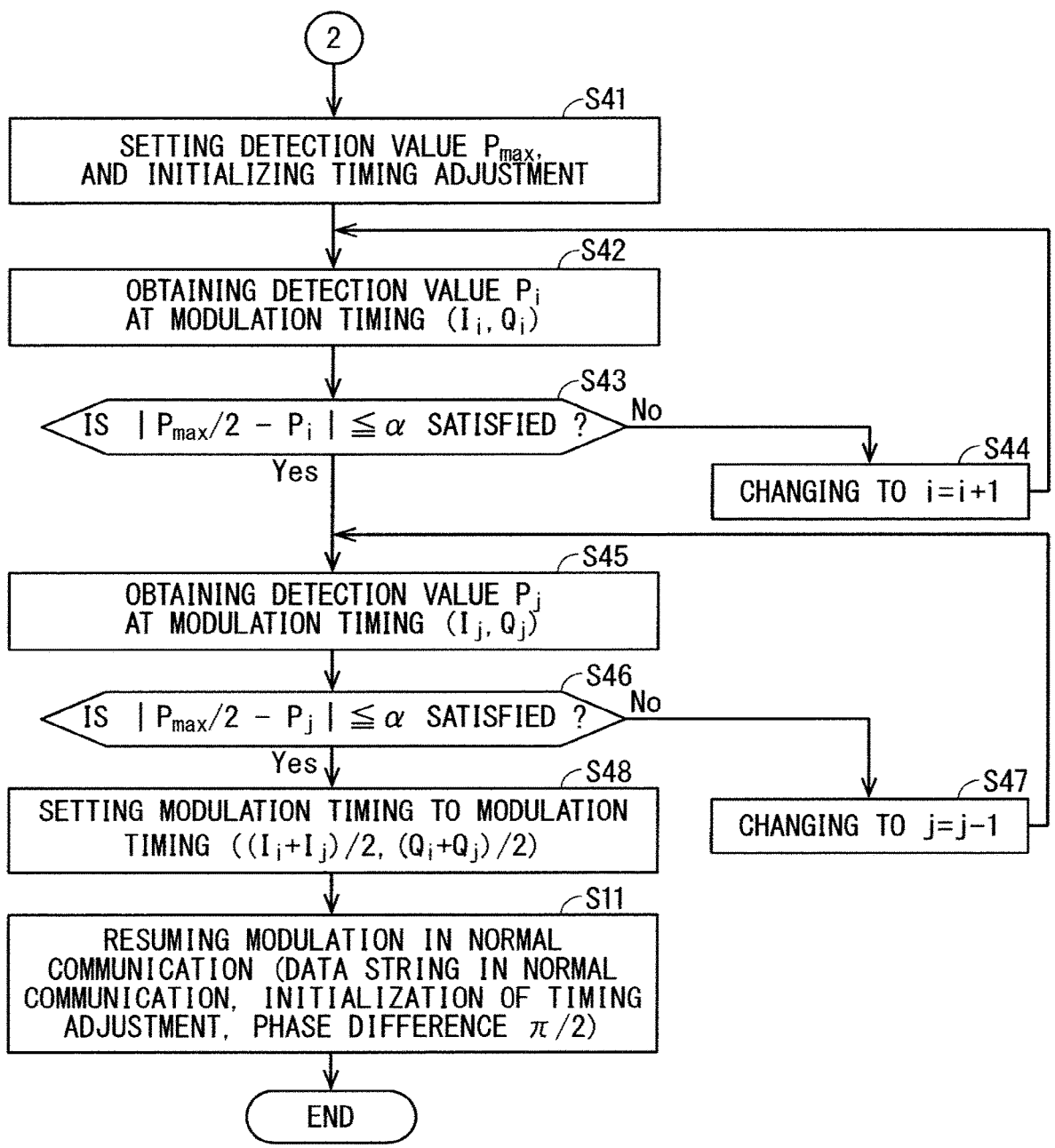
FIG. 14 is a flowchart showing the operation of the optical modulation apparatus according to the fourth embodiment.

FIGS. 13 and 14 are flowcharts showing the operation of the optical modulation apparatus according to the fourth embodiment. As shown in FIGS. 13 and 14, the operation of the optical modulation apparatus according to the fourth embodiment is similar to the operation (FIG. 2) of the optical modulation apparatus according to the first embodiment with the exception of additional steps S41 to S48. The following mainly describes steps S41 to S48.

The processing sequentially goes through steps S1 to S10, which are the first adjustment, followed by steps S41 to S48, which are the second adjustment.

In step S41, the timing adjuster 11 sets the modulation timing adjusted through the first adjustment to $(I_0, Q_0)$. The timing adjuster 11 also sets, to $P_{max}$, the maximum detection value detected at the modulation timing $(I_0, Q_0)$ by the light intensity detector 9, and initializes variables i and j.

In step S42, the timing adjuster 11 obtains, as a detection value $P_i$, the intensity detected at the modulation timing $(I_i, Q_i)$ by the light intensity detector 9.

In step S43, the timing adjuster 11 determines whether $|P_{max}/2-P_i|\le\alpha$ is established. Herein, $\alpha$ denotes a predetermined value indicating an error of, for instance, ±1% of a target value ($P_{max}/2$). The processing proceeds to step S45 if the aforementioned expression is determined to be established. The processing proceeds to step S44 if the expression is determined not to be established.

In step S44, the timing adjuster 11 increments the variable i. The modulation timing is accordingly shifted by one bit in a plus direction. Then, the processing returns to step S42.

In step S45, the timing adjuster 11 obtains, as a detection value $P_j$, the intensity detected at the modulation timing $(I_j, Q_j)$ by the light intensity detector 9.

In step S46, the timing adjuster 11 determines whether $|P_{max}/2-P_j|\le\alpha$ is established. The processing proceeds to step S48 if the aforementioned expression is determined to be established. The processing proceeds to step S47 if the expression is determined not to be established.

In step S47, the timing adjuster 11 decrements the variable j. The modulation timing is accordingly shifted by one bit in a minus direction. Then, the processing returns to step S45.

In step S48, the timing adjuster 11 sets the modulation timings for the first and second optical modulators 3 and 4 to a middle value $(I_i+I_j)/2, (Q_i+Q_j)/2)$ between the modulation timing $(I_i, Q_i)$, determined in step S42, and the modulation timing $(I_j, Q_j)$, determined in step S45.

Gist of Fourth Embodiment

Figure 15:
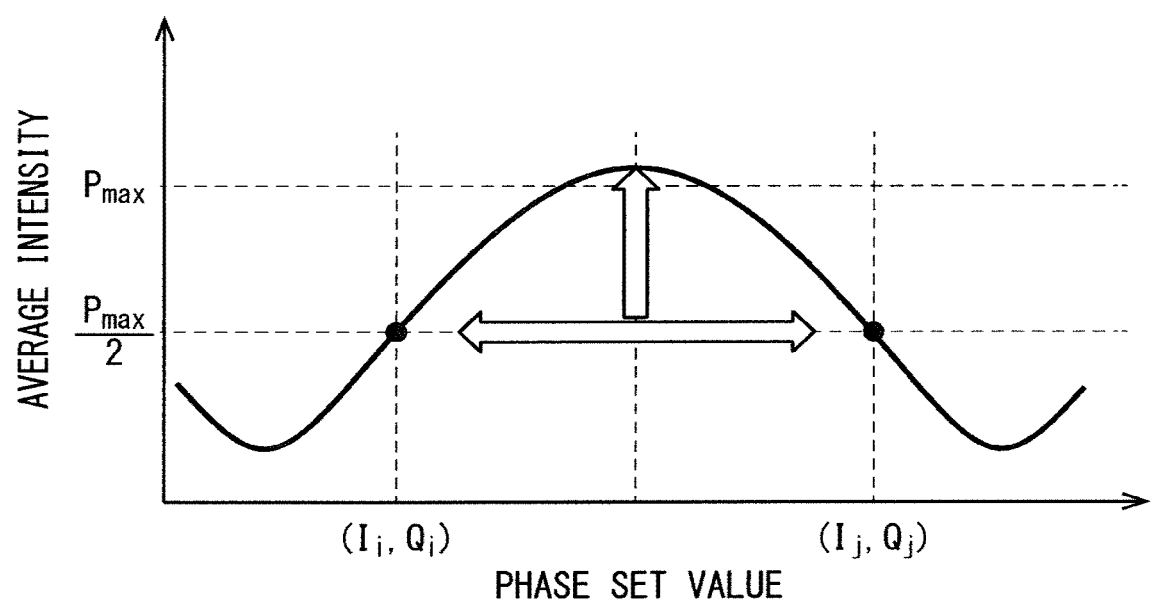
FIG. 15 is a diagram for describing the operation of the optical modulation apparatus according to the fourth embodiment.

The optical modulation apparatus according to the fourth embodiment, like the same in the first embodiment, performs the first adjustment, in which a modulation timing difference equal to or greater than one bit is adjusted. The optical modulation apparatus further performs the second adjustment, thus finely adjusting a modulation timing difference equal to or smaller than one bit near the maximum detection value $P_{max}$, as illustrated in FIG. 15. This enhances the accuracy of modulation timing adjustment.

It is noted that in the present invention, the individual embodiments can be freely combined, or can be modified and omitted as appropriate, within the scope of the invention. It is therefore understood that numerous modifications and variations can be devised without departing from the scope of the invention.

Explanation of Reference Numerals 1 laser light source, 2, 2a, 2b branch, 3, 3a, 3b first optical modulator, 4, 4a, 4b second optical modulator, 6, 6a, 6b phase adjuster, 8, 8a, 8b synthesizer, 9 light intensity detector, 10 data generator, 11 timing adjuster, 13a first optical modulation unit, 13b second optical modulation unit, 21 main branch, 22 polarized-wave rotator, 23 polarized-wave synthesizer.

The invention claimed is:
1. An optical modulation apparatus comprising:
a laser light source configured to output a light beam;
a branch configured to divide the light beam output from the laser light source, into a first light beam and a second light beam;
a data generator configured to generate a first data signal and a second data signal;
a first optical modulator configured to modulate the first light beam on the basis of the first data signal;
a second optical modulator configured to modulate the second light beam on the basis of the second data signal;
a timing adjuster configured to adjust at least one of a modulation timing at which the first optical modulator modulates the first light beam, and a modulation timing at which the second optical modulator modulates the second light beam;
a phase adjuster configured to adjust a phase difference between a first modulated light beam that is the first light beam modulated by the first optical modulator, and a second modulated light beam that is the second light beam modulated by the second optical modulator;
a synthesizer configured to synthesize the first and second modulated light beams, the phase difference between which has been adjusted by the phase adjuster, to generate a synthesized light beam; and
a light intensity detector configured to detect an intensity of the synthesized light beam, wherein the timing adjuster adjusts the modulation timing on the basis of the intensity detected by the light intensity detector, after the data generator respectively generates, as the first data signal and the second data signal, a first test data signal and a second test data signal each comprising a data string containing a test pattern in which a plurality of continuous marks and a plurality of continuous spaces are alternately repeated, and after the phase adjuster adjusts the phase difference to zero or π, a certain number of continuous marks in the plurality of continuous marks is as many as a certain number of continuous spaces in the plurality of continuous spaces, and the optical modulation apparatus further comprises:

a second optical modulation unit that is identical to a first optical modulation unit comprising the branch, the first optical modulator, the second optical modulator, the phase adjuster, and the synthesizer;

a main branch configured to divide the light beam output from the laser light source, and to then output divided light beams to the branches of the first and second optical modulation units;

a polarized-wave rotator configured to rotate a polarized wave of the synthesized light beam generated in the second optical modulation unit by 90 degrees; and a polarized-wave synthesizer configured to synthesize the synthesized light beam generated in the first optical modulation unit, and the synthesized light beam whose polarized wave has been rotated by the polarized-wave rotator, to generate a polarization-multiplexed light beam, wherein the data generator generates the first data signal and the second data signal for each of the first optical modulation unit and the second optical modulation unit, the timing adjuster adjusts the modulation timing for each of the first optical modulation unit and the second optical modulation unit, the light intensity detector detects an intensity of the polarization-multiplexed light beam as the intensity of the synthesized light beam, the timing adjuster adjusts the modulation timing for the first optical modulation unit on the basis of the intensity detected by the light intensity detector, after the intensity of the synthesized light beam generated in the second optical modulation unit is minimized, after the data generator respectively generates, as the first and second data signals of the first optical modulation unit, the first and second test data signals, and after the phase adjuster of the first optical modulation unit adjusts the phase difference in the first optical modulation unit to zero or π, and the timing adjuster adjusts the modulation timing for the second optical modulation unit on the basis of the intensity detected by the light intensity detector, after the intensity of the synthesized light beam generated in the first optical modulation unit is minimized, after the data generator respectively generates, as the first and second data signals of the second optical modulation unit, the first and second test data signals, and after the phase adjuster of the second optical modulation unit adjusts the phase difference in the second optical modulation unit to zero or π.

2. The optical modulation apparatus according to claim 1, wherein
the timing adjuster adjusts the modulation timing in such a manner that the intensity detected by the light intensity detector is maximum, when the test patterns of the first test data signal and the second test data signal generated by the data generator are in phase with each other, and when the phase difference adjusted by the phase adjuster is zero.

3. The optical modulation apparatus according to claim 1, wherein
the timing adjuster adjusts the modulation timing in such a manner that the intensity detected by the light intensity detector is minimum, when the test patterns of the first test data signal and the second test data signal generated by the data generator are out of phase with each other, and when the phase difference adjusted by the phase adjuster is zero.

4. The optical modulation apparatus according to claim 1, wherein
the timing adjuster adjusts the modulation timing in such a manner that the intensity detected by the light intensity detector is minimum, when the test patterns of the first test data signal and the second test data signal generated by the data generator are in phase with each other, and when the phase difference adjusted by the phase adjuster is π.

5. The optical modulation apparatus according to claim 1, wherein
the timing adjuster adjusts the modulation timing in such a manner that the intensity detected by the light intensity detector is maximum, when the test patterns of the first test data signal and the second test data signal generated by the data generator are out of phase with each other, and when the phase difference adjusted by the phase adjuster is π.

6. The optical modulation apparatus according to claim 1, wherein
the timing adjuster adjusts the modulation timing on the basis of the intensity detected by the light intensity detector, after the data generator respectively generates, as the first data signal and the second data signal, a third test data signal and a fourth test data signal each comprising a data string containing a test pattern in which a single mark and a single space are alternately repeated, and after the phase adjuster adjusts the phase difference to zero or π.

7. The optical modulation apparatus according to claim 1, wherein
the timing adjuster adjusts the modulation timing for the first optical modulation unit on the basis of the intensity detected by the light intensity detector, after the intensity of the synthesized light beam generated in the second optical modulation unit is minimized, after the data generator respectively generates, as the first and second data signals of the first optical modulation unit, third and fourth test data signals each comprising a data string containing a test pattern in which a single mark and a single space are alternately repeated, and after the phase adjuster of the first optical modulation unit adjusts the phase difference in the first optical modulation unit to zero or π, and the timing adjuster adjusts the modulation timing for the second optical modulation unit on the basis of the intensity detected by the light intensity detector, after the intensity of the synthesized light beam generated in the first optical modulation unit is minimized, after the data generator respectively generates the third and fourth test data signals as the first and second data signals of the second optical modulation unit, and after the phase adjuster of the second optical modulation unit adjusts the phase difference in the second optical modulation unit to zero or π.

8. The optical modulation apparatus according to claim 1, wherein,
the timing adjuster determines two sets of the modulation timing for the first optical modulator and the modulation timing for the second optical modulator at a time when the intensity detected by the light intensity detector is half an intensity that is predetermined from among intensities detected by the light intensity detector, and
the timing adjuster adjusts the modulation timing for the first optical modulator and the modulation timing for the second optical modulator, to a middle value between one of the two sets of the modulation timing for the first optical modulator and the modulation timing for the second optical modulator, and the other set of the modulation timing for the first optical modulator and the modulation timing for the second optical modulator.

9. The optical modulation apparatus according to claim 1, wherein the timing adjuster adjusts the modulation timing for the first optical modulator and the modulation timing for the second optical modulator by comparing intensities detected at different modulation timings.

10. A timing adjustment method for an optical modulation apparatus, the method comprising:
dividing light from a light source into a first divided light beam and a second divided light beam;
dividing each of the first divided beam and the second divided light beam into a first light beam and a second light beam;
generating a first data signal and a second data signal corresponding to the first divided light beam and a first data signal and a second data signal corresponding to the second divided light beam;
modulating each of the first light beams on the basis of the corresponding generated first data signal;
modulating each of the second light beams on the basis of the corresponding generated second data signal;
adjusting at least one of a modulation timing at which each of the first light beams is modulated, and a modulation timing at which each of the second light beams is modulated;
adjusting a phase difference between a first modulated light beam that is the modulated first light beam corresponding to the first divided light beam, and a second modulated light beam that is the modulated second light beam corresponding to the first divided light beam:
adjusting a phase difference between a third modulated light beam that is the modulated first light beam corresponding to the second divided light beam, and a fourth modulated light beam that is the modulated second light beam corresponding to the second divided light beam;
synthesizing the first and second modulated light beams, the phase difference between which has been adjusted, to generate a first synthesized light beam; and
synthesizing the third and fourth modulated light beams, the phase difference between which has been adjusted, to generate a second synthesized light beam;
detecting an intensity of an output light beam, wherein adjusting the modulation timing comprises:
respectively generating, as the first data signal and the second data signal corresponding to the first divided light beam, a first test data signal and a second test data signal each comprising a data string containing a test pattern in which a plurality of continuous marks and a plurality of continuous spaces are alternately repeated,
respectively generating, as the first data signal and the second data signal corresponding to the second divided light beam, a third test data signal and a fourth test data signal each comprising a data string containing a test pattern in which a plurality of continuous marks and a plurality of continuous spaces are alternately repeated, and
adjusting the phase difference to zero or π, followed by adjusting the modulation timing on the basis of the detected intensity,
a certain number of continuous marks in the plurality of continuous marks is as many as a certain number of continuous spaces in the plurality of continuous spaces, and
the method further comprises:
rotating a polarized wave of the second synthesized light beam by 90 degrees; and
synthesizing the first synthesized light beam and the second synthesized light beam whose polarized wave has been rotated to generate a polarization-multiplexed light beam as the output light beam,
adjusting the modulation timing for the first and second light beams corresponding to the first divided light beam on the basis of the intensity, after an intensity of the second synthesized light beam is minimized, after generating the first and second test data signals corresponding to the first divided light beam, and after adjusting the phase difference between first and second modulated light beams to zero or π, and
adjusting the modulation timing for the first and second light beams corresponding to the second divided light beam on the basis of the intensity, after an intensity of the first synthesized light beam is minimized, after generating, as the first and second data signals corresponding to the second divided light beam, the third and fourth test data signals, and after adjusting the phase difference between the third and fourth modulated light beams to zero or π.

11. The timing adjustment method according to claim 10, wherein the modulation timing at which the first light beam is modulated and the modulation timing at which the second light beam is modulated are adjusted by comparing intensities detected at different modulation timings.

12. An optical modulation apparatus comprising:
a laser light source configured to output a light beam;
a branch configured to divide the light beam output from the laser light source, into a first light beam and a second light beam;
a data generator configured to generate a first data signal and a second data signal;
a first optical modulator configured to modulate the first light beam on the basis of the first data signal;
a second optical modulator configured to modulate the second light beam on the basis of the second data signal;
a timing adjuster configured to adjust at least one of a modulation timing at which the first optical modulator modulates the first light beam, and a modulation timing at which the second optical modulator modulates the second light beam;
a phase adjuster configured to adjust a phase difference between a first modulated light beam that is the first light beam modulated by the first optical modulator, and a second modulated light beam that is the second light beam modulated by the second optical modulator;

a synthesizer configured to synthesize the first and second modulated light beams, the phase difference between which has been adjusted by the phase adjuster, to generate a synthesized light beam; and a light intensity detector configured to detect an intensity of the synthesized light beam, wherein the timing adjuster adjusts the modulation timing on the basis of the intensity detected by the light intensity detector, after the data generator respectively generates, as the first data signal and the second data signal, a first test data signal and a second test data signal each comprising a data string containing a test pattern in which a plurality of continuous marks and a plurality of continuous spaces are alternately repeated, and after the phase adjuster adjusts the phase difference to zero or $\pi$, a certain number of continuous marks in the plurality of continuous marks is as many as a certain number of continuous spaces in the plurality of continuous spaces, the timing adjuster determines two sets of the modulation timing for the first optical modulator and the modulation timing for the second optical modulator at a time when the intensity detected by the light intensity detector is half an intensity that is predetermined from among intensities detected by the light intensity detector, and the timing adjuster adjusts the modulation timing for the first optical modulator and the modulation timing for the second optical modulator, to a middle value between one of the two sets of the modulation timing for the first optical modulator and the modulation timing for the second optical modulator, and the other set of the modulation timing for the first optical modulator and the modulation timing for the second optical modulator.

13. A timing adjustment method for an optical modulation apparatus, the method comprising:

dividing a light beam into a first light beam and a second light beam;

generating a first data signal and a second data signal;

modulating the first light beam on the basis of the generated first data signal;

modulating the second light beam on the basis of the generated second data signal;

adjusting at least one of a modulation timing at which the first light beam is modulated, and a modulation timing at which the second light beam is modulated;

adjusting a phase difference between a first modulated light beam that is the modulated first light beam, and a second modulated light beam that is the modulated second light beam;

synthesizing the first and second modulated light beams, the phase difference between which has been adjusted, to generate a synthesized light beam; and detecting an intensity of the synthesized light beam, wherein adjusting the modulation timing comprises respectively generating, as the first data signal and the second data signal, a first test data signal and a second test data signal each comprising a data string containing a test pattern in which a plurality of continuous marks and a plurality of continuous spaces are alternately repeated, and adjusting the phase difference to zero or $\pi$, followed by adjusting the modulation timing on the basis of the detected intensity, a certain number of continuous marks in the plurality of continuous marks being equal to a certain number of continuous spaces in the plurality of continuous spaces, and the method comprises:

determining two sets of the modulation timing at which the first light beam and the second light beam are modulated at a time when the detected intensity of the synthesized light beam is half an intensity of detected intensities, and adjusting the modulation timing at which the first light beam and the second light beam are modulated, to a middle value between one of the two sets of the modulation timing, and the other set of the modulation timing.

\* \* \* \* \*